United States Patent
Lyzenga et al.

(10) Patent No.: US 9,688,442 B2
(45) Date of Patent: Jun. 27, 2017

(54) RECLOSABLE FLEXIBLE FILM PACKAGING PRODUCTS AND METHODS OF MANUFACTURE

(75) Inventors: Deborah A. Lyzenga, Long Valley, NJ (US); Jeffrey T. Weber, Lake Zurich, IL (US); James Anthony Glydon, Cedar Knolls, NJ (US); Evan Michael Ziolkowski, Chicago, IL (US)

(73) Assignee: Intercontinental Great Brands LLC, East Hanover, NJ (US)

(*) Notice: Subject to any disclaimer, the term of this patent is extended or adjusted under 35 U.S.C. 154(b) by 0 days.

(21) Appl. No.: 14/005,783

(22) PCT Filed: Mar. 16, 2012

(86) PCT No.: PCT/US2012/029486
§ 371 (c)(1),
(2), (4) Date: Nov. 27, 2013

(87) PCT Pub. No.: WO2012/125945
PCT Pub. Date: Sep. 20, 2012

(65) Prior Publication Data
US 2014/0079343 A1    Mar. 20, 2014

Related U.S. Application Data

(60) Provisional application No. 61/453,872, filed on Mar. 17, 2011.

(51) Int. Cl.
*B65D 33/00* (2006.01)
*B65D 33/20* (2006.01)
(Continued)

(52) U.S. Cl.
CPC .............. *B65D 33/20* (2013.01); *B31B 1/20* (2013.01); *B31B 1/25* (2013.01); *B31B 1/26* (2013.01);
(Continued)

(58) Field of Classification Search
CPC ...... B65D 31/02; B65D 33/20; B65D 33/004; B65D 75/5838; B65D 2575/586
(Continued)

(56) References Cited

U.S. PATENT DOCUMENTS 401,974 A    4/1889   Smith
811,092 A    1/1906   Roberts
(Continued)

FOREIGN PATENT DOCUMENTS

AU    768679    6/2001
BR    55008852  11/2001
(Continued)

OTHER PUBLICATIONS

Machine translation of EP 1449789 description. Translated on Jun. 13, 2015.*
(Continued)

*Primary Examiner* — Jes F Pascua
(74) *Attorney, Agent, or Firm* — Fitch, Even, Tabin & Flannery LLP

(57) ABSTRACT

The present disclosure relates to a reclosable flexible film package with a flexible film having a folded edge, at least two opposing free edges, and at least a front panel and a back panel. The front and back panels define an interior space. The flexible film package also may have a score in the flexible film of the front panel forming a flap that defines an opening when the flap is moved upward, toward the folded edge and a label extending uninterrupted from edge to edge of the at least two opposing free edges, the label being attached on the film by pressure sensitive adhesive, and extending beyond the score on the front panel to reseal the package opening defined by the flap.

26 Claims, 24 Drawing Sheets

(51) Int. Cl.

| | | |
|---|---|---|
| *B65B 61/18* | (2006.01) | |
| *B65D 75/58* | (2006.01) | |
| *B65B 41/16* | (2006.01) | |
| *B65B 51/30* | (2006.01) | |
| *B65B 61/02* | (2006.01) | |
| *B65B 61/10* | (2006.01) | |
| *B65B 9/073* | (2012.01) | |
| *B31B 1/20* | (2006.01) | |
| *B31B 1/25* | (2006.01) | |
| *B31B 1/26* | (2006.01) | |
| *B31B 1/88* | (2006.01) | |
| *B31B 1/90* | (2006.01) | |
| *B32B 3/30* | (2006.01) | |

(52) U.S. Cl.
CPC .................. *B31B 1/88* (2013.01); *B31B 1/90* (2013.01); *B32B 3/30* (2013.01); *B65B 9/073* (2013.01); *B65B 41/16* (2013.01); *B65B 51/303* (2013.01); *B65B 51/306* (2013.01); *B65B 61/02* (2013.01); *B65B 61/10* (2013.01); *B65B 61/182* (2013.01); *B65D 33/004* (2013.01); *B65D 75/5838* (2013.01); *B65D 2575/586* (2013.01); *Y10T 428/15* (2015.01)

(58) Field of Classification Search
USPC ........... 383/203, 204, 207–209, 66, 113, 116
See application file for complete search history.

(56) References Cited

U.S. PATENT DOCUMENTS

| | | |
|---|---|---|
| 1,065,012 A | 6/1913 | Watanabe |
| 1,106,721 A | 8/1914 | Lewis |
| 1,171,462 A | 2/1916 | Rice |
| 1,791,352 A | 2/1931 | Pascual |
| 1,915,503 A * | 6/1933 | Schmidt ............. B65D 85/1027 206/264 |
| 1,949,161 A | 2/1934 | Haug |
| 1,963,639 A | 6/1934 | Ahlquist |
| 1,978,035 A | 10/1934 | Thom |
| 2,033,550 A | 3/1936 | Rosen |
| 2,034,007 A | 3/1936 | Smith |
| 2,066,495 A | 1/1937 | Swift |
| 2,079,328 A | 5/1937 | McBean |
| 2,128,196 A | 8/1938 | Max |
| 2,248,578 A | 7/1941 | Moore |
| 2,260,064 A | 10/1941 | Stokes |
| 2,320,143 A | 5/1943 | Johnson |
| 2,321,042 A | 6/1943 | Preis |
| 2,330,015 A | 9/1943 | Stokes |
| 2,475,236 A | 7/1949 | Matthew |
| 2,554,160 A | 5/1951 | Von |
| 2,588,409 A | 3/1952 | Olsen |
| 2,605,897 A | 8/1952 | Rundle |
| 2,621,788 A | 12/1952 | Hitchcock |
| 2,684,807 A | 7/1954 | Gerrish |
| 2,719,647 A | 10/1955 | Freeman |
| 2,823,795 A | 2/1958 | Moore |
| 2,965,224 A | 12/1960 | Harwood |
| 3,080,238 A | 3/1963 | Howard |
| 3,127,273 A | 3/1964 | Monahan |
| 3,179,326 A | 4/1965 | Underwood |
| 3,186,628 A | 6/1965 | Rohde |
| 3,187,982 A | 6/1965 | Underwood |
| 3,217,871 A | 11/1965 | Lee |
| 3,235,165 A | 2/1966 | Jackson |
| 3,259,303 A | 7/1966 | Repko |
| 3,260,358 A | 7/1966 | Gottily |
| 3,272,422 A | 9/1966 | Miller |
| 3,291,377 A | 12/1966 | Eggen |
| 3,298,505 A | 1/1967 | Stephenson |
| 3,311,032 A | 3/1967 | Lucas |
| 3,326,450 A | 6/1967 | Langdon |
| 3,331,501 A | 7/1967 | Stewart |
| 3,343,541 A | 9/1967 | Bellamy |
| 3,373,922 A | 3/1968 | Watts |
| 3,373,926 A | 3/1968 | Voigtman |
| 3,454,210 A | 7/1969 | Spiegel |
| 3,471,005 A | 10/1969 | Sexstone |
| 3,528,825 A | 9/1970 | Doughty |
| 3,570,751 A | 3/1971 | Trewella |
| 3,595,466 A | 7/1971 | Rosenburg |
| 3,595,468 A | 7/1971 | Repko |
| 3,618,751 A | 11/1971 | Rich |
| 3,630,346 A | 12/1971 | Burnside |
| 3,651,615 A | 3/1972 | Bohner |
| 3,653,502 A | 4/1972 | Beaudoin |
| 3,685,720 A | 8/1972 | Brady |
| 3,687,352 A | 8/1972 | Kalajian |
| 3,740,238 A | 6/1973 | Graham |
| 3,757,078 A | 9/1973 | Conti |
| 3,790,744 A | 2/1974 | Bowen |
| 3,811,564 A | 5/1974 | Braber |
| 3,865,302 A | 2/1975 | Kane |
| 3,885,727 A | 5/1975 | Gilley |
| 3,905,646 A | 9/1975 | Brackmann |
| 3,909,582 A | 9/1975 | Bowen |
| 3,910,410 A | 10/1975 | Shaw |
| 3,938,659 A | 2/1976 | Wardwell |
| 3,966,046 A | 6/1976 | Deutschlander |
| 3,971,506 A | 7/1976 | Roenna |
| 3,979,050 A | 9/1976 | Cilia |
| 4,082,216 A | 4/1978 | Clarke |
| 4,113,104 A | 9/1978 | Meyers |
| 4,140,046 A | 2/1979 | Marbach |
| 4,143,695 A | 3/1979 | Hoehn |
| 4,156,493 A | 5/1979 | Julius |
| 4,185,754 A | 1/1980 | Julius |
| 4,192,420 A * | 3/1980 | Worrell et al. ................ 206/205 |
| 4,192,448 A | 3/1980 | Porth |
| 4,197,949 A | 4/1980 | Carlsson |
| 4,210,246 A | 7/1980 | Kuchenbecker |
| 4,258,876 A | 3/1981 | Ljungcrantz |
| 4,260,061 A | 4/1981 | Jacobs |
| 4,273,815 A | 6/1981 | Gifford |
| 4,285,681 A | 8/1981 | Walitalo |
| 4,306,367 A | 12/1981 | Otto |
| 4,337,862 A | 7/1982 | Suter |
| 4,364,478 A | 12/1982 | Tuens |
| 4,397,415 A | 8/1983 | Lisiecki |
| 4,411,365 A | 10/1983 | Horikawa |
| 4,420,080 A | 12/1983 | Nakamura |
| 4,428,477 A | 1/1984 | Cristofolo |
| 4,460,088 A | 7/1984 | Rugenstein |
| 4,464,154 A | 8/1984 | Ljungcrantz |
| 4,488,647 A | 12/1984 | Davis |
| 4,506,488 A | 3/1985 | Matt et al. |
| 4,518,087 A | 5/1985 | Goglio |
| 4,538,396 A | 9/1985 | Nakamura |
| 4,545,844 A | 10/1985 | Buchanan |
| 4,548,824 A | 10/1985 | Mitchell |
| 4,548,852 A | 10/1985 | Mitchell |
| 4,549,063 A | 10/1985 | Ang |
| 4,550,831 A | 11/1985 | Whitford |
| 4,552,269 A * | 11/1985 | Chang ............................ 383/211 |
| 4,557,505 A | 12/1985 | Schaefer |
| 4,570,820 A | 2/1986 | Murphy |
| 4,572,377 A | 2/1986 | Beckett |
| 4,589,943 A | 5/1986 | Kimball |
| 4,608,288 A | 8/1986 | Spindler |
| 4,610,357 A | 9/1986 | Nakamura |
| 4,613,046 A | 9/1986 | Kuchenbecker |
| 4,616,470 A | 10/1986 | Nakamura |
| 4,625,495 A | 12/1986 | Holovach |
| 4,632,299 A * | 12/1986 | Holmberg ............. B65D 5/705 206/813 |
| 4,638,911 A | 1/1987 | Prohaska |
| 4,648,509 A | 3/1987 | Alves |
| 4,651,874 A | 3/1987 | Nakamura |
| 4,653,250 A | 3/1987 | Nakamura |
| 4,658,963 A | 4/1987 | Jud |
| 4,667,453 A | 5/1987 | Goglio |

(56) References Cited

U.S. PATENT DOCUMENTS

| | | | |
|---|---|---|---|
| 4,671,453 A | 6/1987 | Cassidy |
| 4,673,085 A | 6/1987 | Badouard |
| 4,679,693 A | 7/1987 | Forman |
| 4,694,960 A | 9/1987 | Phipps |
| 4,696,404 A | 9/1987 | Corella |
| 4,709,399 A | 11/1987 | Sanders |
| 4,723,301 A | 2/1988 | Chang |
| 4,738,365 A | 4/1988 | Prater |
| 4,739,879 A | 4/1988 | Nakamura |
| 4,770,325 A | 9/1988 | Gordon |
| 4,784,885 A | 11/1988 | Carespodi |
| 4,786,355 A | 11/1988 | Kontz |
| 4,790,436 A | 12/1988 | Nakamura |
| 4,798,295 A | 1/1989 | Rausing |
| 4,798,296 A | 1/1989 | Lagerstedt |
| 4,799,594 A | 1/1989 | Blackman |
| 4,811,848 A | 3/1989 | Jud |
| 4,818,120 A | 4/1989 | Addiego |
| 4,838,429 A | 6/1989 | Fabisiewicz |
| 4,840,270 A | 6/1989 | Caputo |
| 4,845,470 A | 7/1989 | Boldt |
| 4,848,575 A | 7/1989 | Nakamura |
| 4,858,780 A | 8/1989 | Odaka et al. |
| 4,863,064 A | 9/1989 | Dailey |
| 4,865,198 A | 9/1989 | Butler |
| 4,866,911 A | 9/1989 | Grindrod |
| 4,874,096 A | 10/1989 | Tessera-Chiesa |
| 4,876,123 A | 10/1989 | Rivera |
| 4,889,731 A | 12/1989 | Williams |
| 4,901,505 A | 2/1990 | Williams, Jr. |
| 4,902,142 A | 2/1990 | Lammert |
| 4,917,247 A | 4/1990 | Jud |
| 4,943,439 A | 7/1990 | Andreas |
| 4,972,953 A | 11/1990 | Friedman |
| 4,998,666 A | 3/1991 | Ewan |
| 4,999,081 A | 3/1991 | Buchanan |
| 5,000,320 A | 3/1991 | Kuchenbecker |
| 5,001,325 A | 3/1991 | Huizinga |
| 5,005,264 A | 4/1991 | Breen |
| 5,010,231 A | 4/1991 | Huizinga |
| 5,018,625 A | 5/1991 | Focke |
| 5,029,712 A * | 7/1991 | O'Brien | B65D 75/5838 229/123.3 |
| 5,040,685 A | 8/1991 | Focke |
| 5,046,621 A | 9/1991 | Bell |
| 5,048,718 A | 9/1991 | Nakamura |
| 5,054,619 A | 10/1991 | Muckenfuhs |
| 5,060,848 A | 10/1991 | Ewan |
| 5,065,868 A | 11/1991 | Cornelissen |
| 5,076,439 A | 12/1991 | Kuchenbecker |
| 5,077,064 A | 12/1991 | Hustad |
| 5,078,509 A | 1/1992 | Center |
| 5,082,702 A | 1/1992 | Alband |
| 5,085,724 A | 2/1992 | Focke |
| 5,096,113 A | 3/1992 | Focke |
| 5,100,003 A | 3/1992 | Jud |
| 5,103,980 A | 4/1992 | Kuchenbecker |
| 5,108,669 A | 4/1992 | van Dijk et al. |
| 5,124,388 A | 6/1992 | Pruett |
| 5,125,211 A | 6/1992 | OBrien |
| 5,134,001 A | 7/1992 | Osgood |
| 5,158,499 A | 10/1992 | Guckenberger |
| 5,161,350 A | 11/1992 | Nakamura |
| 5,167,455 A | 12/1992 | Forman |
| 5,167,974 A | 12/1992 | Grindrod |
| 5,174,659 A | 12/1992 | Laske |
| 5,184,771 A | 2/1993 | Jud |
| 5,190,152 A | 3/1993 | Smith |
| 5,197,618 A | 3/1993 | Goth |
| 5,222,422 A | 6/1993 | Benner |
| 5,222,813 A | 6/1993 | Kopp |
| 5,229,180 A | 7/1993 | Littmann |
| 5,294,470 A | 3/1994 | Ewan |
| 5,307,988 A | 5/1994 | Focke |
| 5,310,262 A * | 5/1994 | Robison | B65D 75/5894 383/113 |
| 5,333,735 A | 8/1994 | Focke |
| 5,344,007 A | 9/1994 | Nakamura |
| 5,352,466 A | 10/1994 | Delonis |
| 5,356,068 A | 10/1994 | Moreno |
| 5,366,087 A | 11/1994 | Bane |
| 5,371,997 A | 12/1994 | Kopp |
| 5,374,179 A | 12/1994 | Swanson |
| 5,375,698 A | 12/1994 | Ewart |
| 5,381,643 A | 1/1995 | Kazaitis |
| 5,382,190 A | 1/1995 | Graves |
| 5,388,757 A | 2/1995 | Lorenzen |
| 5,405,629 A | 4/1995 | Marnocha |
| 5,407,070 A | 4/1995 | Bascos |
| 5,409,115 A | 4/1995 | Barkhorn |
| 5,409,116 A | 4/1995 | Aronsen |
| 5,439,102 A | 8/1995 | Brown |
| 5,454,207 A | 10/1995 | Storandt |
| 5,460,838 A | 10/1995 | Wermund |
| 5,460,844 A | 10/1995 | Gaylor |
| 5,461,845 A | 10/1995 | Yeager |
| 5,464,092 A | 11/1995 | Seeley |
| 5,470,015 A | 11/1995 | Jud |
| 5,489,060 A | 2/1996 | Godard |
| 5,499,757 A | 3/1996 | Back |
| 5,503,858 A | 4/1996 | Reskow |
| 5,505,305 A | 4/1996 | Scholz |
| 5,515,965 A | 5/1996 | Boldrini |
| 5,519,982 A | 5/1996 | Herber |
| 5,520,939 A | 5/1996 | Wells |
| 5,524,759 A | 6/1996 | Herzberg |
| 5,531,325 A | 7/1996 | Deflander |
| 5,538,129 A | 7/1996 | Chester |
| 5,550,346 A | 8/1996 | Andriash |
| 5,558,438 A | 9/1996 | Warr |
| 5,582,342 A | 12/1996 | Jud |
| 5,582,853 A | 12/1996 | Marnocha |
| 5,582,887 A | 12/1996 | Etheredge |
| 5,591,468 A | 1/1997 | Stockley |
| 5,630,308 A | 5/1997 | Guckenberger |
| 5,633,058 A | 5/1997 | Hoffer |
| 5,636,732 A | 6/1997 | Gilels |
| 5,637,369 A | 6/1997 | Stewart |
| 5,647,100 A | 7/1997 | Porchia |
| 5,647,506 A | 7/1997 | Julius |
| 5,664,677 A | 9/1997 | OConnor |
| 5,672,224 A | 9/1997 | Kaufmann |
| 5,688,394 A | 11/1997 | McBride |
| 5,688,463 A | 11/1997 | Robichaud |
| 5,702,743 A | 12/1997 | Wells |
| 5,709,479 A | 1/1998 | Bell |
| 5,725,311 A | 3/1998 | Ponsi |
| D394,204 S | 5/1998 | Seddon |
| D394,605 S | 5/1998 | Skiba |
| 5,749,657 A | 5/1998 | May |
| 5,770,283 A | 6/1998 | Gosselin |
| 5,791,465 A | 8/1998 | Niki |
| 5,795,604 A | 8/1998 | Wells |
| 5,819,931 A | 10/1998 | Boucher et al. |
| 5,820,953 A | 10/1998 | Beer |
| 5,833,368 A * | 11/1998 | Kaufman | B65D 75/5838 383/202 |
| 5,855,435 A | 1/1999 | Chiesa |
| 5,862,101 A | 1/1999 | Haas |
| 5,873,483 A | 2/1999 | Goertz |
| 5,873,607 A | 2/1999 | Waggoner |
| 5,882,116 A | 3/1999 | Backus |
| 5,885,673 A | 3/1999 | Light |
| 5,906,278 A | 5/1999 | Ponsi |
| 5,908,246 A | 6/1999 | Arimura |
| 5,928,749 A | 7/1999 | Forman |
| 5,938,013 A | 8/1999 | Palumbo |
| 5,939,156 A | 8/1999 | Rossi |
| 5,945,145 A | 8/1999 | Narsutis |
| 5,956,794 A | 9/1999 | Skiba |
| 5,993,962 A | 11/1999 | Timm |
| 5,996,797 A | 12/1999 | Flaig |
| 5,997,177 A | 12/1999 | Kaufman |

(56) References Cited

U.S. PATENT DOCUMENTS

| | | | |
|---|---|---|---|
| 6,006,907 A | 12/1999 | Sato | |
| 6,012,572 A * | 1/2000 | Heathcock et al. | 206/233 |
| 6,015,934 A | 1/2000 | Lee | |
| 6,026,953 A | 2/2000 | Nakamura | |
| 6,028,289 A | 2/2000 | Robichaud | |
| 6,029,809 A | 2/2000 | Skiba | |
| 6,056,141 A * | 5/2000 | Navarini et al. | 220/269 |
| 6,060,095 A | 5/2000 | Scrimager | |
| 6,065,591 A | 5/2000 | Dill | |
| 6,066,437 A | 5/2000 | Kosslinger | |
| 6,076,969 A | 6/2000 | Jaisle | |
| 6,077,551 A | 6/2000 | Scrimager | |
| 6,099,682 A | 8/2000 | Krampe | |
| 6,113,271 A | 9/2000 | Scott | |
| 6,125,614 A | 10/2000 | Jones | |
| 6,126,009 A | 10/2000 | Shiffler | |
| 6,126,317 A | 10/2000 | Anderson | |
| 6,152,601 A | 11/2000 | Johnson | |
| 6,164,441 A | 12/2000 | Guy | |
| 6,213,645 B1 | 4/2001 | Beer | |
| 6,228,450 B1 | 5/2001 | Pedrini | |
| D447,054 S | 8/2001 | Hill | |
| 6,273,610 B1 | 8/2001 | Koyama | |
| 6,279,297 B1 | 8/2001 | Latronico | |
| 6,296,884 B1 | 10/2001 | Okerlund | |
| 6,299,355 B1 | 10/2001 | Schneck | |
| 6,309,104 B1 | 10/2001 | Koch | |
| 6,309,105 B1 * | 10/2001 | Palumbo | 383/211 |
| 6,318,894 B1 | 11/2001 | Derenthal | |
| 6,325,877 B1 | 12/2001 | Murphy | |
| 6,352,364 B1 | 3/2002 | Mobs | |
| 6,364,113 B1 | 4/2002 | Faasse | |
| 6,365,255 B1 | 4/2002 | Kittel | |
| 6,383,592 B1 | 5/2002 | Lowry | |
| 6,402,379 B1 | 6/2002 | Albright | |
| 6,420,006 B1 | 7/2002 | Scott | |
| 6,427,420 B1 | 8/2002 | Olivieri | |
| 6,428,208 B1 | 8/2002 | Addison | |
| 6,428,867 B1 | 8/2002 | Scott | |
| 6,446,811 B1 | 9/2002 | Wilfong | |
| 6,450,685 B1 | 9/2002 | Scott | |
| 6,457,585 B1 | 10/2002 | Huffer | |
| 6,461,043 B1 | 10/2002 | Healy | |
| 6,461,708 B1 | 10/2002 | Dronzek | |
| 6,471,817 B1 | 10/2002 | Emmert | |
| 6,476,743 B1 | 11/2002 | Brown | |
| 6,482,867 B1 | 11/2002 | Kimura | |
| 6,502,986 B1 | 1/2003 | Bensur | |
| 6,517,243 B2 | 2/2003 | Huffer | |
| 6,519,918 B2 | 2/2003 | Forman et al. | |
| 6,539,691 B2 | 4/2003 | Beer | |
| 6,554,134 B1 * | 4/2003 | Guibert | 206/494 |
| 6,563,082 B2 | 5/2003 | Terada | |
| 6,589,622 B1 * | 7/2003 | Scott | B65D 75/5838 |
| | | | 206/807 |
| 6,592,260 B1 | 7/2003 | Randall | |
| 6,594,872 B2 | 7/2003 | Cisek | |
| 6,616,334 B2 | 9/2003 | Faaborg | |
| 6,621,046 B2 | 9/2003 | Kaji | |
| 6,669,046 B1 | 12/2003 | Sawada | |
| 6,691,886 B1 | 2/2004 | Berndt | |
| 6,698,928 B2 | 3/2004 | Miller | |
| 6,726,054 B2 | 4/2004 | Fagen | |
| 6,726,364 B2 | 4/2004 | Perell | |
| 6,746,743 B2 | 6/2004 | Knoerzer | |
| 6,750,423 B2 | 6/2004 | Tanaka | |
| 6,767,604 B2 | 7/2004 | Muir | |
| 6,815,634 B2 | 11/2004 | Sonoda | |
| 6,852,947 B2 | 2/2005 | Tanaka | |
| 6,865,860 B2 | 3/2005 | Arakawa | |
| 6,889,483 B2 | 5/2005 | Compton | |
| 6,918,532 B2 | 7/2005 | Sierra-Gomez | |
| 6,929,400 B2 | 8/2005 | Razeti | |
| 6,932,135 B2 | 8/2005 | Tabuchi | |
| 6,945,400 B2 | 9/2005 | Bolnick | |
| 6,951,999 B2 | 10/2005 | Monforton | |
| 6,969,196 B2 | 11/2005 | Woodham | |
| 6,983,875 B2 | 1/2006 | Emmott | |
| 7,007,423 B2 | 3/2006 | Andersson | |
| 7,018,502 B2 | 3/2006 | Treleaven | |
| 7,021,827 B2 | 4/2006 | Compton | |
| 7,032,754 B2 | 4/2006 | Kopecky | |
| 7,032,757 B2 | 4/2006 | Richards | |
| 7,032,810 B2 | 4/2006 | Benedetti et al. | |
| 7,040,810 B2 | 5/2006 | Steele | |
| 7,048,441 B2 | 5/2006 | Pape | |
| 7,051,877 B2 | 5/2006 | Lin | |
| 7,165,888 B2 | 1/2007 | Rodick | |
| 7,172,779 B2 | 2/2007 | Castellanos | |
| 7,207,718 B2 | 4/2007 | Machacek | |
| 7,207,719 B2 | 4/2007 | Marbler | |
| 7,213,710 B2 | 5/2007 | Cotert | |
| 7,228,968 B1 | 6/2007 | Burgess | |
| 7,254,873 B2 | 8/2007 | Stolmeier | |
| 7,261,468 B2 | 8/2007 | Schneider | |
| 7,262,335 B2 | 8/2007 | Motsch | |
| 7,302,783 B2 | 12/2007 | Cotert | |
| 7,350,688 B2 | 4/2008 | Sierra-Gomez | |
| 7,351,458 B2 | 4/2008 | Leighton | |
| 7,352,591 B2 | 4/2008 | Sugahara | |
| 7,404,487 B2 | 7/2008 | Kumakura | |
| 7,416,768 B2 * | 8/2008 | Knoerzer | B32B 3/02 |
| | | | 383/62 |
| 7,422,142 B2 | 9/2008 | Arippol | |
| 7,470,062 B2 | 12/2008 | Moteki | |
| 7,475,781 B2 | 1/2009 | Kobayashi | |
| 7,516,599 B2 | 4/2009 | Doll | |
| 7,527,189 B2 | 5/2009 | Billig | |
| 7,533,773 B2 | 5/2009 | Aldridge | |
| 7,600,641 B2 | 10/2009 | Burgess | |
| 7,703,602 B2 | 4/2010 | Saito | |
| 7,708,463 B2 | 5/2010 | Sampaio Camacho | |
| 7,717,620 B2 * | 5/2010 | Hebert et al. | 383/203 |
| 7,740,923 B2 | 6/2010 | Exner | |
| 7,758,484 B2 | 7/2010 | Peterson | |
| 7,858,901 B2 | 12/2010 | Krishnan | |
| 7,971,718 B2 | 7/2011 | Aldridge | |
| 8,002,171 B2 | 8/2011 | Ryan | |
| 8,002,941 B2 | 8/2011 | Exner | |
| 8,029,428 B2 | 10/2011 | Selle | |
| 8,038,349 B2 | 10/2011 | Andersson | |
| 8,181,784 B2 | 5/2012 | Bouthiette | |
| 8,240,546 B2 | 8/2012 | Friebe | |
| 8,262,830 B2 * | 9/2012 | Hebert et al. | 156/268 |
| 8,262,832 B2 * | 9/2012 | Hebert et al. | 156/268 |
| 8,273,434 B2 | 9/2012 | Zietlow | |
| 8,506,165 B2 | 8/2013 | Shinozaki | |
| 8,540,839 B2 | 9/2013 | Zietlow | |
| 8,544,519 B2 | 10/2013 | Ikeda | |
| 8,607,980 B2 * | 12/2013 | Aldridge et al. | 206/460 |
| 8,763,890 B2 | 7/2014 | Clark | |
| 8,920,030 B2 | 12/2014 | McSweeney | |
| 8,951,591 B2 | 2/2015 | Vogt | |
| 8,986,803 B2 | 3/2015 | Yoshida | |
| 8,999,100 B2 | 4/2015 | Carmichael | |
| 2001/0000480 A1 | 4/2001 | Stagg | |
| 2002/0000441 A1 | 1/2002 | Redmond | |
| 2002/0068668 A1 | 6/2002 | Chow | |
| 2003/0019780 A1 | 1/2003 | Parodi | |
| 2003/0039412 A1 | 2/2003 | Rodick | |
| 2003/0047695 A1 | 3/2003 | Zik | |
| 2003/0051440 A1 | 3/2003 | Chow | |
| 2003/0053720 A1 | 3/2003 | Smith et al. | |
| 2003/0118255 A1 | 6/2003 | Miller | |
| 2003/0127352 A1 | 7/2003 | Buschkiel | |
| 2003/0170357 A1 | 9/2003 | Garwood | |
| 2003/0183637 A1 | 10/2003 | Zappa | |
| 2003/0183643 A1 | 10/2003 | Fagen | |
| 2003/0210838 A1 | 11/2003 | Steele | |
| 2003/0217946 A1 | 11/2003 | Hsu | |
| 2003/0223656 A1 | 12/2003 | Razeti | |
| 2004/0011677 A1 | 1/2004 | Arakawa | |
| 2004/0035719 A1 | 2/2004 | Ebbers | |
| 2004/0060974 A1 | 4/2004 | Dacey | |

(56) References Cited

U.S. PATENT DOCUMENTS

| | | |
|---|---|---|
| 2004/0062838 A1 | 4/2004 | Castellanos |
| 2004/0067326 A1 | 4/2004 | Knoerzer |
| 2004/0083680 A1 | 5/2004 | Compton |
| 2004/0091184 A1 | 5/2004 | Miller |
| 2004/0112010 A1 | 6/2004 | Richards |
| 2004/0112771 A1 | 6/2004 | Bailey |
| 2004/0150221 A1 | 8/2004 | Brown |
| 2004/0175060 A1 | 9/2004 | Woodham |
| 2004/0180118 A1 | 9/2004 | Renger |
| 2004/0206637 A1 | 10/2004 | Sierra-Gomez |
| 2005/0000965 A1 | 1/2005 | Boardman |
| 2005/0031233 A1 | 2/2005 | Varanese et al. |
| 2005/0084186 A1 | 4/2005 | Caris |
| 2005/0116016 A1 | 6/2005 | Lo Duca |
| 2005/0117819 A1 | 6/2005 | Kingsford |
| 2005/0220371 A1 | 10/2005 | Machacek |
| 2005/0247764 A1 | 11/2005 | Sierra-Gomez |
| 2005/0276885 A1 | 12/2005 | Bennett |
| 2006/0018569 A1 | 1/2006 | Bonenfant |
| 2006/0066096 A1 | 3/2006 | Kan |
| 2006/0124494 A1 | 6/2006 | Clark |
| 2006/0144911 A1 | 7/2006 | Sierra-Gomez |
| 2006/0171611 A1 | 8/2006 | Rapparini |
| 2006/0199717 A1 | 9/2006 | Marbler |
| 2006/0251342 A1 | 11/2006 | Forman |
| 2006/0257056 A1 | 11/2006 | Miyake |
| 2006/0257599 A1 | 11/2006 | Exner |
| 2006/0283750 A1* | 12/2006 | Villars et al. ............ 206/494 |
| 2006/0285779 A1 | 12/2006 | Golas |
| 2007/0023435 A1 | 2/2007 | Sierra-Gomez |
| 2007/0023436 A1* | 2/2007 | Sierra-Gomez et al. .. 220/359.2 |
| 2007/0095709 A1* | 5/2007 | Saito et al. ............... 206/494 |
| 2007/0116388 A1* | 5/2007 | Kuge ................ B65D 33/2508 383/203 |
| 2007/0140600 A1 | 6/2007 | Nowak |
| 2007/0209959 A1 | 9/2007 | Burgess |
| 2007/0269142 A1 | 11/2007 | Tyska |
| 2007/0275133 A1 | 11/2007 | Sierra-Gomez |
| 2008/0013869 A1 | 1/2008 | Forman |
| 2008/0031555 A1 | 2/2008 | Roberts |
| 2008/0034713 A1 | 2/2008 | Kohl |
| 2008/0037911 A1* | 2/2008 | Cole et al. ............... 383/203 |
| 2008/0041750 A1 | 2/2008 | Kohlweyer |
| 2008/0053861 A1 | 3/2008 | Mellin |
| 2008/0060751 A1 | 3/2008 | Arrindell |
| 2008/0063324 A1 | 3/2008 | Bernard |
| 2008/0063759 A1 | 3/2008 | Raymond |
| 2008/0063760 A1 | 3/2008 | Raymond |
| 2008/0101733 A1 | 5/2008 | Fenn-Barrabass |
| 2008/0131035 A1 | 6/2008 | Rogers |
| 2008/0135428 A1 | 6/2008 | Tallier |
| 2008/0152264 A1 | 6/2008 | Pokusa |
| 2008/0156861 A1* | 7/2008 | Sierra-Gomez et al. ..... 229/214 |
| 2008/0159666 A1 | 7/2008 | Exner |
| 2008/0199109 A1 | 8/2008 | Rutzinger |
| 2008/0203141 A1 | 8/2008 | Friebe |
| 2008/0214376 A1 | 9/2008 | Bonenfant |
| 2008/0220227 A1* | 9/2008 | Keeney ................ B32B 27/18 428/203 |
| 2008/0240627 A1* | 10/2008 | Cole et al. ............... 383/204 |
| 2008/0273821 A1 | 11/2008 | Doll |
| 2008/0292225 A1 | 11/2008 | Dayrit |
| 2009/0001143 A1 | 1/2009 | Cowan |
| 2009/0014491 A1 | 1/2009 | Fuisz |
| 2009/0022431 A1 | 1/2009 | Conner |
| 2009/0028472 A1* | 1/2009 | Andersson ............ B65D 75/44 383/205 |
| 2009/0053372 A1 | 2/2009 | Hambrick |
| 2009/0074333 A1 | 3/2009 | Griebel |
| 2009/0097786 A1 | 4/2009 | Goglio |
| 2009/0161995 A1 | 6/2009 | Henderson et al. |
| 2009/0190866 A1 | 7/2009 | Hughes |
| 2009/0211938 A1 | 8/2009 | Aldridge |
| 2009/0226117 A1* | 9/2009 | Davis et al. ............... 383/5 |
| 2009/0232425 A1 | 9/2009 | Tai |
| 2009/0273179 A1 | 11/2009 | Scott |
| 2009/0301903 A1 | 12/2009 | Andersson |
| 2010/0002963 A1 | 1/2010 | Holbert |
| 2010/0018974 A1 | 1/2010 | Lyzenga |
| 2010/0019022 A1 | 1/2010 | Ryan |
| 2010/0111453 A1 | 5/2010 | Dierl |
| 2010/0147724 A1 | 6/2010 | Mitra-Shah |
| 2010/0172604 A1* | 7/2010 | Andersson et al. .......... 383/211 |
| 2010/0226598 A1 | 9/2010 | Stoeppelmann |
| 2010/0230303 A1 | 9/2010 | Buse |
| 2010/0230411 A9 | 9/2010 | Sierra-Gomez |
| 2010/0278454 A1 | 11/2010 | Huffer |
| 2010/0303391 A9 | 12/2010 | Cole |
| 2011/0049158 A1 | 3/2011 | Bouthiette |
| 2011/0058755 A1* | 3/2011 | Guibert ............ B65D 33/1691 383/42 |
| 2011/0127319 A1 | 6/2011 | Golden |
| 2011/0132976 A1 | 6/2011 | Drewnowski |
| 2011/0147443 A1 | 6/2011 | Igo |
| 2011/0204056 A1 | 8/2011 | Veternik et al. |
| 2011/0253718 A1 | 10/2011 | Sierra-Gomez et al. |
| 2012/0125932 A1 | 5/2012 | Sierra-Gomez |
| 2012/0128835 A1 | 5/2012 | Lyzenga et al. |
| 2012/0177307 A1* | 7/2012 | Duan et al. ................. 383/211 |
| 2013/0004626 A1 | 1/2013 | Renders et al. |
| 2013/0011527 A1 | 1/2013 | Renders et al. |
| 2013/0064477 A1 | 3/2013 | Vogt et al. |
| 2013/0064934 A1 | 3/2013 | Vogt |
| 2013/0114918 A1 | 5/2013 | Lyzenga et al. |
| 2013/0121623 A1 | 5/2013 | Lyzenga |
| 2013/0121624 A1 | 5/2013 | Lyzenga |
| 2013/0205964 A1 | 8/2013 | Matsushita |
| 2013/0270268 A1 | 10/2013 | Lyzenga |
| 2014/0185965 A1* | 7/2014 | Lyzenga ........................ 383/99 |
| 2014/0270597 A1 | 9/2014 | Friedman |
| 2014/0314339 A1 | 10/2014 | Docherty |
| 2015/0016756 A1 | 1/2015 | Down |
| 2015/0021219 A1 | 1/2015 | SeyfferthDeOliveira |

FOREIGN PATENT DOCUMENTS

| | | | |
|---|---|---|---|
| BR | 62020307 | 4/2003 | |
| BR | 68046367 | 10/2009 | |
| CN | 1224396 A | 7/1999 | |
| CN | 1781819 A | 6/2006 | |
| DE | 1848870 | 3/1962 | |
| DE | 3700988 A1 | 7/1988 | |
| DE | 3835721 A1 * | 5/1990 | ............ B31B 19/90 |
| DE | 3835721 A1 | 5/1990 | |
| DE | 9003401 | 5/1990 | |
| DE | 9005297 | 8/1990 | |
| DE | 9014065 | 2/1991 | |
| DE | 4134567 | 1/1993 | |
| DE | 4241423 | 6/1994 | |
| DE | 19738411 | 3/1999 | |
| DE | 19822328 A1 | 11/1999 | |
| DE | 202004012301 | 12/2004 | |
| DE | 20122333 | 3/2005 | |
| DE | 202007005487 | 6/2007 | |
| DE | 102007030267 A1 | 1/2009 | |
| DE | 102010019867 A1 | 9/2011 | |
| EP | 0085289 | 8/1983 | |
| EP | 0307924 A2 | 3/1989 | |
| EP | 0388310 | 9/1990 | |
| EP | 0408831 A1 | 1/1991 | |
| EP | 0447636 | 9/1991 | |
| EP | 0474981 | 3/1992 | |
| EP | 0488967 | 6/1992 | |
| EP | 0546369 | 6/1993 | |
| EP | 0608909 | 8/1994 | |
| EP | 0613824 | 9/1994 | |
| EP | 0629561 A2 | 12/1994 | |
| EP | 0661154 | 7/1995 | |
| EP | 0669204 B2 | 8/1995 | |
| EP | 0744357 | 11/1996 | |
| EP | 0752375 | 1/1997 | |
| EP | 0758993 | 2/1997 | |
| EP | 0796208 | 9/1997 | |
| EP | 0905048 A | 3/1999 | |

(56) References Cited

FOREIGN PATENT DOCUMENTS

| | | | | |
|---|---|---|---|---|
| EP | 1046594 | 10/2000 | | |
| EP | 1056066 | 11/2000 | | |
| EP | 1086906 A2 | 3/2001 | | |
| EP | 1136379 | 9/2001 | | |
| EP | 1288139 | 3/2003 | | |
| EP | 1318081 A1 | 6/2003 | | |
| EP | 1350741 | 10/2003 | | |
| EP | 1375380 A1 | 1/2004 | | |
| EP | 1382543 A2 | 1/2004 | | |
| EP | 1437311 A1 | 7/2004 | | |
| EP | 1449789 A1 * | 8/2004 | ............ | B65D 77/20 |
| EP | 1457424 | 9/2004 | | |
| EP | 1467929 | 10/2004 | | |
| EP | 1468936 | 10/2004 | | |
| EP | 1477425 A1 | 11/2004 | | |
| EP | 1488936 | 12/2004 | | |
| EP | 1608567 | 12/2005 | | |
| EP | 1609737 | 12/2005 | | |
| EP | 1619137 A1 | 1/2006 | | |
| EP | 1637472 A1 | 3/2006 | | |
| EP | 1351861 | 10/2006 | | |
| EP | 1712468 | 10/2006 | | |
| EP | 1712488 A1 | 10/2006 | | |
| EP | 1755980 | 2/2007 | | |
| EP | 1760006 A1 | 3/2007 | | |
| EP | 1770025 | 4/2007 | | |
| EP | 1846306 | 10/2007 | | |
| EP | 1858776 | 11/2007 | | |
| EP | 1873082 A1 | 1/2008 | | |
| EP | 1908696 | 4/2008 | | |
| EP | 1939107 | 7/2008 | | |
| EP | 1975081 A1 | 10/2008 | | |
| EP | 2033910 | 3/2009 | | |
| EP | 2189506 | 5/2010 | | |
| FR | 1327914 A | 5/1963 | | |
| FR | 2674509 | 10/1992 | | |
| FR | 2693988 | 1/1994 | | |
| FR | 2766794 | 2/1999 | | |
| FR | 2772009 | 6/1999 | | |
| FR | 2783512 | 3/2000 | | |
| GB | 1107200 | 3/1968 | | |
| GB | 2171077 | 8/1986 | | |
| GB | 2266513 | 11/1993 | | |
| GB | 2276095 A | 9/1994 | | |
| GB | 2335652 A | 9/1999 | | |
| GB | 2339187 A * | 1/2000 | ............ | B65D 31/08 |
| GB | 2339187 A | 1/2000 | | |
| JP | 57163658 | 10/1982 | | |
| JP | S5822411 B2 | 5/1983 | | |
| JP | 6080405 | 5/1985 | | |
| JP | 62171479 | 10/1987 | | |
| JP | 63022370 | 1/1988 | | |
| JP | 01167084 A | 6/1989 | | |
| JP | 01226579 A | 9/1989 | | |
| JP | 01267182 A | 10/1989 | | |
| JP | H11343468 | 12/1990 | | |
| JP | H0581083 | 11/1993 | | |
| JP | 09142551 A | 6/1997 | | |
| JP | 9150872 | 6/1997 | | |
| JP | H09156677 A | 6/1997 | | |
| JP | 10059441 | 3/1998 | | |
| JP | 10129685 | 5/1998 | | |
| JP | 10167355 A * | 6/1998 | | |
| JP | H10152179 A | 9/1998 | | |
| JP | H10509406 | 9/1998 | | |
| JP | 10120016 | 12/1998 | | |
| JP | H0444968 | 2/1999 | | |
| JP | 11198977 | 7/1999 | | |
| JP | 2000335542 A | 12/2000 | | |
| JP | 2001114357 | 4/2001 | | |
| JP | 2001301807 | 10/2001 | | |
| JP | 2002002805 A | 1/2002 | | |
| JP | 2002104550 A | 4/2002 | | |
| JP | 200326224 | 1/2003 | | |
| JP | 2003072774 | 3/2003 | | |
| JP | 2003137314 | 5/2003 | | |
| JP | 2005015015 | 1/2005 | | |
| JP | 200602767 | 2/2006 | | |
| JP | 2006062712 | 3/2006 | | |
| JP | 2006137445 A | 6/2006 | | |
| JP | 2006199343 | 8/2006 | | |
| JP | 2007045434 | 2/2007 | | |
| JP | 2008105751 | 5/2008 | | |
| JP | 2009166870 | 7/2009 | | |
| WO | 8606350 | 11/1986 | | |
| WO | 9104920 | 4/1991 | | |
| WO | WO 9104920 A1 * | 4/1991 | ............ | B65D 75/58 |
| WO | 9411270 A1 | 5/1994 | | |
| WO | 9424019 A2 | 10/1994 | | |
| WO | 9532902 | 12/1995 | | |
| WO | 9725200 | 7/1997 | | |
| WO | WO 00/61458 A1 * | 10/2000 | | |
| WO | 0064755 | 11/2000 | | |
| WO | 0140073 A1 | 6/2001 | | |
| WO | 02064365 A1 | 8/2002 | | |
| WO | 02066341 | 8/2002 | | |
| WO | 03013976 A1 | 2/2003 | | |
| WO | 03035504 | 5/2003 | | |
| WO | 03037727 | 5/2003 | | |
| WO | 03059776 A1 | 7/2003 | | |
| WO | 2004087527 A1 | 10/2004 | | |
| WO | 2005054079 | 6/2005 | | |
| WO | 2005056420 | 6/2005 | | |
| WO | 2005110042 | 11/2005 | | |
| WO | 2005110865 | 11/2005 | | |
| WO | 2005110876 | 11/2005 | | |
| WO | 2005110885 A2 | 11/2005 | | |
| WO | 2005120989 | 12/2005 | | |
| WO | 2005123535 A1 | 12/2005 | | |
| WO | 2006055128 A2 | 5/2006 | | |
| WO | 2006080405 | 8/2006 | | |
| WO | 2006108614 | 10/2006 | | |
| WO | 2007079071 A1 | 7/2007 | | |
| WO | 2007090419 | 8/2007 | | |
| WO | 2008051813 | 5/2008 | | |
| WO | 2008062159 A1 | 5/2008 | | |
| WO | WO 2008051813 A1 * | 5/2008 | ............ | B65D 75/20 |
| WO | 2008074060 | 6/2008 | | |
| WO | 2008108969 | 9/2008 | | |
| WO | 2008115693 A1 | 9/2008 | | |
| WO | WO 2008115693 A1 * | 9/2008 | ............ | B31B 19/14 |
| WO | 2008122961 | 10/2008 | | |
| WO | 2008146142 | 12/2008 | | |
| WO | 2009065120 | 5/2009 | | |
| WO | 2009111153 | 9/2009 | | |
| WO | 2010002834 | 1/2010 | | |
| WO | 2010046623 | 4/2010 | | |
| WO | 2010080810 | 7/2010 | | |
| WO | 2010084336 A1 | 7/2010 | | |
| WO | 2010088492 A1 | 8/2010 | | |
| WO | 2010114879 A1 | 10/2010 | | |
| WO | 2010149996 A1 | 12/2010 | | |
| WO | 2011004156 A2 | 1/2011 | | |
| WO | 2011032064 | 3/2011 | | |
| WO | 2011121337 A2 | 10/2011 | | |
| WO | 2011123410 | 10/2011 | | |
| WO | 2012036765 | 3/2012 | | |
| WO | 2012098412 A1 | 7/2012 | | |

OTHER PUBLICATIONS

Machine translation of the description of DE 38 35 721.*
Machine translation of the description of JP 10167355 A.*
Machine translation of CN 1781819A published Jun. 7, 2006 from google.com/patents; 13 pages, accessed Jun. 5, 2014.
'Cheese Range', Mintel gnpd, Jan. 26, 2001, Mintel Publishing, 1 page.
'Elite Edam Cheese', Mintel gnpd, Dec. 3, 2001, Mintel Publishing, 2 pages.
'Margin.' Merriam-Webster Online Dictionary. 2010. Merriam-Webster [online], retrieved on May 6, 2010, Retrieved from the internet:URL: http://www.merriam-webster.com/dictionary/margin, 3 pages.

(56) References Cited

OTHER PUBLICATIONS

'New Easy Peel Cheese Packaging', Mintel gnpd, Aug. 10, 2001, Mintel Publishing.
'New on the Shelf-Product Instructions and Packaging Trends', Circle Reader Service Card No. 93, Aug. 1998, Baking & Snack.
'Soft Bread Sticks', Mintel gnpd, Mar. 20, 1998, Mintel Publishing, 1 page.
"Wall's Bacon" A Sizzling Success Story and The Grocer: "When sealed delivers", the second page of which bears a date of Aug. 21, 1999.
Defendants' Final Invalidity Contentions—Exhibit A-1, dated Sep. 27, 2013, 55 pages.
Defendants' Final Invalidity Contentions—Exhibit A-2, dated Sep. 27, 2013, 35 pages.
Defendants' Final Invalidity Contentions—Exhibit A-3, dated Sep. 27, 2013, 34 pages.
Defendants' Final Invalidity Contentions—Exhibit A-4, dated Sep. 27, 2013, 35 pages.
Defendants' Final Invalidity Contentions—Exhibit B-1, dated Sep. 27, 2013, 135 pages.
Defendants' Final Invalidity Contentions—Exhibit B-2, dated Sep. 27, 2013, 64 pages.
Defendants' Final Invalidity Contentions—Exhibit B-3, dated Sep. 27, 2013, 140 pages.
Defendants' Final Invalidity Contentions—Exhibit B-4, dated Sep. 27, 2013, 273 pages.
Defendants' Final Invalidity Contentions—Exhibit B-5, dated Sep. 27, 2013, 146 pages.
Defendants' Final Invalidity Contentions—Exhibit B-6, dated Sep. 27, 2013, 226 pages.
Defendants' Final Invalidity Contentions Pursuant to LPR 3.1, dated Sep. 27, 2013, 22 pages.
Defendants' Final Unenforceability Contentions Pursuant to LPR 3.1, dated Sep. 27, 2013, 14 pages.
Defendants' Initial Non-Infringement Contentions Pursuant to LPR 2.3(a), dated May 17, 2013, 7 pages.
Defendants' Invalidity Contentions—Exhibit A-1, dated May 17, 2013, 55 pages.
Defendants' Invalidity Contentions—Exhibit A-2, dated May 17, 2013, 35 pages.
Defendants' Invalidity Contentions—Exhibit A-3, dated May 17, 2013, 34 pages.
Defendants' Invalidity Contentions—Exhibit A-4, dated May 17, 2013, 35 pages.
Defendants' invalidity Contentions—Exhibit A-5, dated May 17, 2013, 39 pages.
Defendants' Invalidity Contentions Pursuant to LPR 2.3, dated May 17, 2013, 23 pages.
Defendants' LPR 2.3 Initial Non-Infringement Contentions Exhibit A, dated May 17, 2013, 39 pages.
Defendants' Unenforceability Contentions Pursuant to LPR 2.3, dated May 17, 2013, 13 pages.
Defendants\Answer, Affirmative Defenses, and Counterclaims Responsive to Complaint, dated Apr. 5, 2012, 25 pages.
English Transiation of JP H09-158677 published on Jun. 17, 1997, 2 pages.
English Translation of Japanese Official Notice of Rejection mailed on Feb. 14, 2012 in JP Application No. 2009-172352, 3 pages.
English Translation of JP 1998-152179 (H10-152179 A), published on Sep. 6, 1998, 6 pages.
English Translation of JP 2001-114357 published on Apr. 24, 2001, 8 pages.
English Translation of JP 2003-26224 published on Jan. 29, 2003, 13 pages.
English Translation of JP H09-156677 published Jun. 17, 1995; 8 pgs.
English Translation of JP Official Notice of Rejection mailed on Jan. 29, 2013 in JP Appl. No. 2008-087152 citing JPH0581083, 5 pages.
European Packaging Pack Report, NR. May 5, 2001 and partial translation thereof, 6 pages.
European Search Report, EP10305289 citing DE1848870U, 3 pages.
European Search Report 06118142.6 dated May 3, 2007, citing DE90140656, 10 pages.
Fuji Packaging GmbH Fachpack brochure, Oct. 11-12, 2001; 2 pgs.
Giant Baby Wipes package, item No. 80203-91, resealable package having die cut-out portions (tabs) which remain affixed to the top of the package after label is withdrawn from the top, whereby tamper evidence is indicated by a misalignment of the die cut-out portions with the holes formed in the label.
Global Brands' LPR 2.5 Initial Response to Defendants' Initial Invalidity Contentions Chart Ex. A-1, dated May 31, 2013, 30 pages.
Global Brands' LPR 2.5 Initial Response to Defendants' Initial Invalidity Contentions Chart Ex. A-2, dated May 31, 2013, 20 pages.
Global Brands' LPR 2.5 Initial Response to Defendants' Initial Invalidity Contentions Chart Ex. A-3, dated May 31, 2013, 21 pages.
Global Brands' LPR 2.5 Initial Response to Defendants' Initial Invalidity Contentions Chart Ex. A-5, dated May 31, 2013, 14 pages.
Global Brands LPR 2.5 Initial Response to Defendants' Initial Invalidity Contentions Chart Ex. A-4, dated May 31, 2013, 17 pages.
International Search Report, PCT/EP2011/054250 dated Jun. 28, 2011, 3 pages.
Machine translation of claim for BR 5500885-2 from Googletranslate.com; 1 pg.
Machine translation of claim for BR 6202030-7 from Googletranslate.com; 1 pg.
Machine translation of claim for BR 6804636-7 from Googletranslate.com; 1 pg.
Machine translation of DE 202007005487, published Jun. 14, 2007, provided by Espacenet, 3 pages.
Machine translation of DE9014065, published Mar. 19, 2009, provided by Espacenet, 9 pages.
Machinery Update, Mar./Apr. 2002, pp. 56-62.
Machinery Update, Sep./Oct. 2001, pp. 46-47.
Opposition to EP1679269 filed by Awapatent AB, Heisingborg, Sweden. May 2, 2012.
Opposition to EP1679269 filed by Bahlse GmbH and Co. KG, Apr. 30, 2012.
Partial European Search Report for Appl. No. EP11155570 dated Jun. 12, 2011, citing DE9003401 and DE9005297, 9 pages.
Plaintiffs Initial Response to Defendant's Initial Invalidity Contentions, dated May 31, 2013, 20 pages.
Plaintiffs Answer to Counterclaims of Defendant, dated Apr. 26, 2013, 20 pages.
Plaintiffs Complaint for Patent Infringement, dated Jan. 16, 2013, 7 pages.
Reclosure system lengthens food life, Packaging News PPMA Preview, Sep. 2001, 4 pages.
Reseal-It. Web page Internet print out accessed Mar. 14, 2005; 19 pages.
English Translation of Japanese Unexamined Application Publication No. H9-156677, published Jul. 17, 1997; 6 pages.
Kellogg's Reply Claim Construction Brief, dated Jan. 24, 2014, 19 pages.
Kellogg's Opening Claim Construction Brief, dated Dec. 13, 2013, 30 pages.
Defendants' Supplemental Memorandum of Law Regarding Additional Claim Construction Authority Requested by the Court, dated Feb. 28, 2014, 13 pages.
Kellogg's Response to Plaintiff's Surreply Claim Construction Brief Pursuant to Docket No. 98, dated Feb. 28, 2014, 9 pages.
Plaintiff Intercontinental Great Brands LLC's Submission of Authority Pursuant to Docket No. 98, dated Feb. 28, 2014, 11 pages.
Plaintiff Intercontinental Great Brands LLC's Responsive Claim Construction Brief Pursuant to LPR 4.2, dated Feb. 10, 2014, 27 pages.

(56) References Cited

OTHER PUBLICATIONS

U.S. District Court for the Northern District of Illinois, Eastern Division Memorandum Opinion and Order, dated Sep. 22, 2014, 12 pages.
Plaintiff Intercontinental Great Brands LLC\s Surreply Claim Construction Brief Pursuant to Docket No. 98, dated Feb. 21, 2014, 6 pages.
Additional Exhibits from Declaration of James Lukas Jr. filed Mar. 26, 2015, 73 pages.
Declaration of James J. Lukas, Jr. in Support of Defendants' Motion for Summary Judgment with Exhibits, Part 1 dated Mar. 23, 2015, 277 pages.
Declaration of James J. Lukas, Jr. in Support of Defendants' Opposition to Plaintiff's Motions for Summary Judgment with Exhibits (redacted), dated May 28, 2015, 228 pages.
Declaration of Katie Crosby Lehmann in Support of Plaintiff's Consolidated Memorandum of Law in Support of Plaintiff's Cross-Motion for Summary Judgment with Exhibits Part 1 (redacted), dated May 8, 2015, 400 pages.
Declaration of Katie Crosby Lehmann in Support of Plaintiff's Reply in Support of its Motions for Summary Judgment and Exhibit (unsealed), dated Jun. 10, 2015, 8 pages.
Defendants' Consolidated Memorandum in Support of Motion for Summary Judgment (redacted) with Exhibits A-G, dated Mar. 23, 2015, 166 pages.
Defendants' Consolidated Reply in Support of Defendants' Motion for Summary Judgment with Exhibits, dated May 28, 2015, 36 pages.
Defendants' Local Rule 56.1 Statement of Material Facts in Support of Motion for Summary Judgment (redacted), dated Mar. 23, 2015, 75 pages.
Defendants' LR 56.1 (b) (3) (C) Statement of Additional Material Facts in Support of Their Opposition to Plaintiff's Motions for Summary Judgment (redacted), dated May 28, 2015, 30 pages.
Defendants' Memorandum in Support of Motion for Summary Judgment of Non-Infringement and Their Motion for Summary Judgment of Invalidity Under 35 U.S.C. 102 and/or 103, dated Mar. 26, 2015, 60 pages.
Defendants' Memorandum in Support of Their Motion to Compel Discovery, dated Oct. 13, 2014, 13 pages.
Defendants' Motion for Summary Judgment of Non-Infringement and Motion for Summary Judgment of Invalidity Under 35 U.S.C. 102 And/Or 103, dated Mar. 23, 2015, 4 pages.
Defendants' Motion to Compel Discovery, dated Oct. 13, 2014, 3 pages.
Defendants' Response to Plaintiff's Local Rule 56.1 Statement of Material Facts in Support of Plaintiff's Motions for Summary Judgment, dated May 28, 2015, 108 pages.
Exhibits, part 2, to Declaration of James J. Lukas, Jr. in Support of Defendants' Motion for Summary Judgment, dated Mar. 23, 2015 125 pages.
Exhibits, part 2, to Declaration of Katie Crosby Lehmann in Support of Plaintiff's Consolidated Memorandum of Law in Support of Plaintiff's Cross-Motion for Summary Judgment (redacted), dated May 8, 2015, 300 pages.
Exhibits, part 3, to Declaration of James J. Lukas, Jr. in Support of Defendants' Motion for Summary Judgment, dated Mar. 23, 2015, 125 pages.
Exhibits, part 3, to Declaration of Katie Crosby Lehmann in Support of Plaintiff's Consolidated Memorandum of Law in Support of Plaintiffs Cross-Motion for Summary Judgment (redacted), dated May 8, 2015, 100 pages.
Exhibits, part 4, to Declaration of James J. Lukas, Jr. in Support of Defendants' Motion for Summary Judgment with Exhibits, dated Mar. 23, 2015, 28 pages.
Exhibits, part 4, to Declaration of Katie Crosby Lehmann in Support of Plaintiff's Consolidated Memorandum of Law in Support of Plaintiff's Cross-Motion for Summary Judgment (redacted), dated May 8, 2015, 100 pages.
Exhibits, part 5, to Declaration of Katie Crosby Lehmann in Support of Plaintiff's Consolidated Memorandum of Law in Support of Plaintiff's Cross-Motion for Summary Judgment (redacted), dated May 8, 2015, 200 pages.
Exhibits, part 6, to Declaration of Katie Crosby Lehmann in Support of Plaintiff's Consolidated Memorandum of Law in Support of Plaintiff's Cross-Motion for Summary Judgment (redacted),dated May 8, 2015, 300 pages.
Exhibits, part 7, to Declaration of Katie Crosby Lehmann in Support of Plaintiff's Consolidated Memorandum of Law in Support of Plaintiff's Cross-Motion for Summary Judgment (redacted),dated May 8, 2015, 136 pages.
Exhibits from Defendants' Memorandum in Support of Their Motion to Compel Discovery, dated Oct. 13, 2014, 68 pages.
Exhibits from Plaintiff's Memorandum of Law in Opposition to Defendants' Motion to Compel Discovery, Oct. 15, 2014, 78 pages.
Plaintiff's Consolidated Memorandum of Law in Support of Plaintiff's Cross-Motion for Summary Judgment, dated May 8, 2015, 54 pages.
Plaintiff's Cross-Motion for Summary Judgment, dated Apr. 27, 2015, 4 pages.
Plaintiff's LR 56.1(a) Response to Defendants' Statement of Additional Material Facts in Support of Their Opposition to Plaintiff's Motion for Summary Judgment (redacted), dated Jun. 10, 2015, 39 pages.
Plaintiff's Memorandum of Law in Opposition to Defendants' Motion to Compel Discovery, Oct. 15, 2014, 12 pages.
Plaintiff's Reply in Support of its Motions for Summary Judgment, dated Jun. 1, 2015, 19 pages.
Machine Translation of EP 1449789 description. Translated on Jun. 13, 2015, 18 pages.
Defendant's Local Rule 56.1 Statement of Material Facts in Support of Motion for Summary Judgment, dated Mar. 23, 2015, 75 pages.
U.S. District Court for the Northern District of Illinois, Eastern Division, Memorandum Opinion and Order, dated Aug. 3, 2015, 37 pages.
English Translation of JP2002-002805 filed by Onuma, published Sep. 1, 2012, translation provided by the USPTO in U.S. Appl. No. 11/193,614.
English Translation of JP2006137445 filed by Shimomura, published Jun. 1, 2006, translation provided by the USPTO in U.S. Appl. No. 13/698,567.
English Translation of JP2003-026224 published Jan. 29, 2003, translated on Jul. 27, 2015. Translation provided by USPTO in U.S. Appl. No. 14/175,434, 9 pages.
English Translation of JP2001-301807 published Oct. 31, 2001, translated on Jul. 27, 2015. Translation provided by USPTO in U.S. Appl. No. 14/175,434, 6 pages.
Definition of "end." Webster's New World Dictionary, Third College Edition. 1988 Simon & Schuster, cited by USPTO in U.S. Appl. No. 11/193,614, dated Jan. 21, 2016, 3 pages.
Non-Confidential Brief For Plaintiff-Appellant Intercontinental Great Brands LLC, dated Dec. 30, 2015, 149 pages, filed with the Federal Circuit in Case Nos. 2015-2082, -2084 (litigation related to U.S. Pat. No. 6,918,532).
Reply Brief of Defendants-Cross-Appellants; dated Oct. 14, 2016, 37 pages, filed with the Federal Circuit in Case Nos. 2015-2082, -2084.
Non-Confidential Responsive/Reply Brief For Plaintiff-Appellant Intercontinental Great Brands LLC, dated Sep. 30, 2016; 69 pages, filed with the Federal Circuit in Case Nos. 2015-2082, -2084.
Brief of Defendants-Cross-Appellants; dated Jun. 17, 2016; 86 pages, filed with the Federal Circuit in Case Nos. 2015-2082, -2084.
European Extended Search Report for Application No. 16180214.5, dated Sep. 26, 2016, 7 pages.

\* cited by examiner

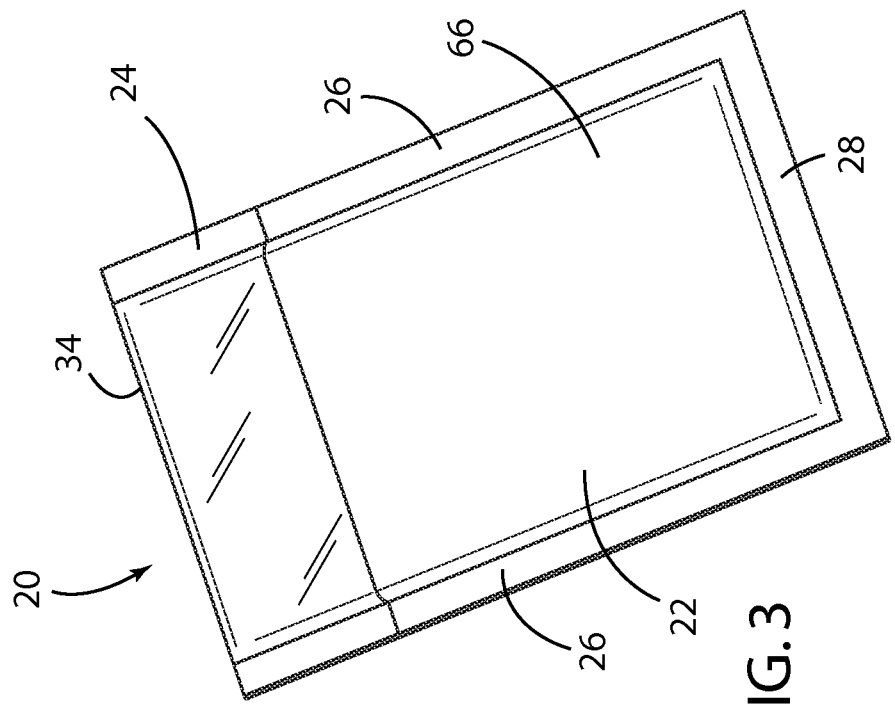
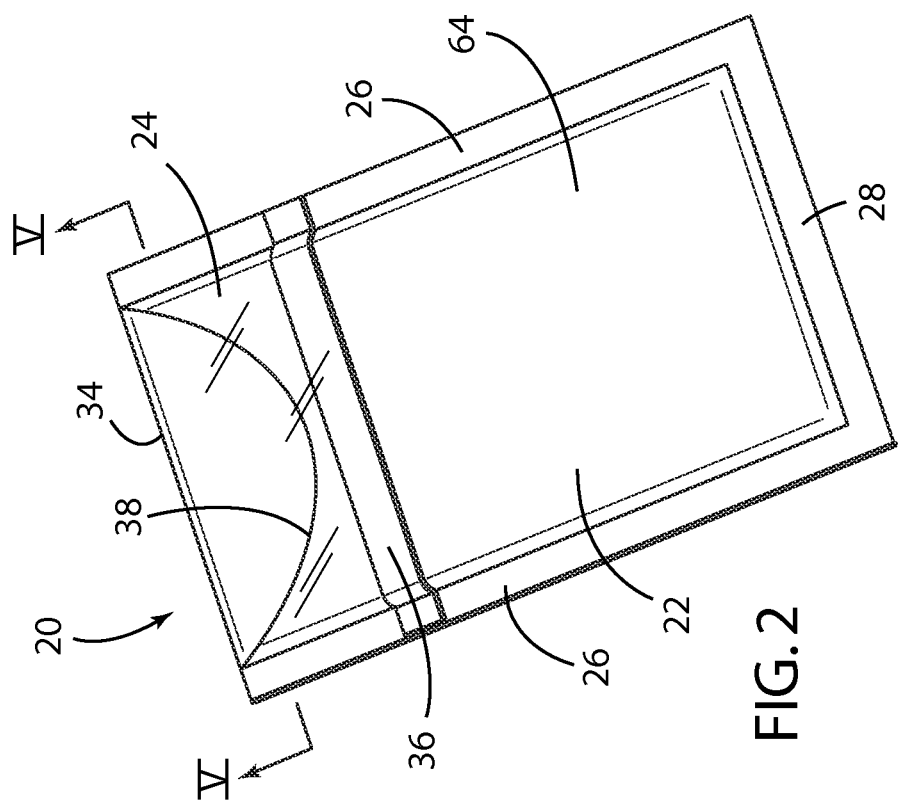

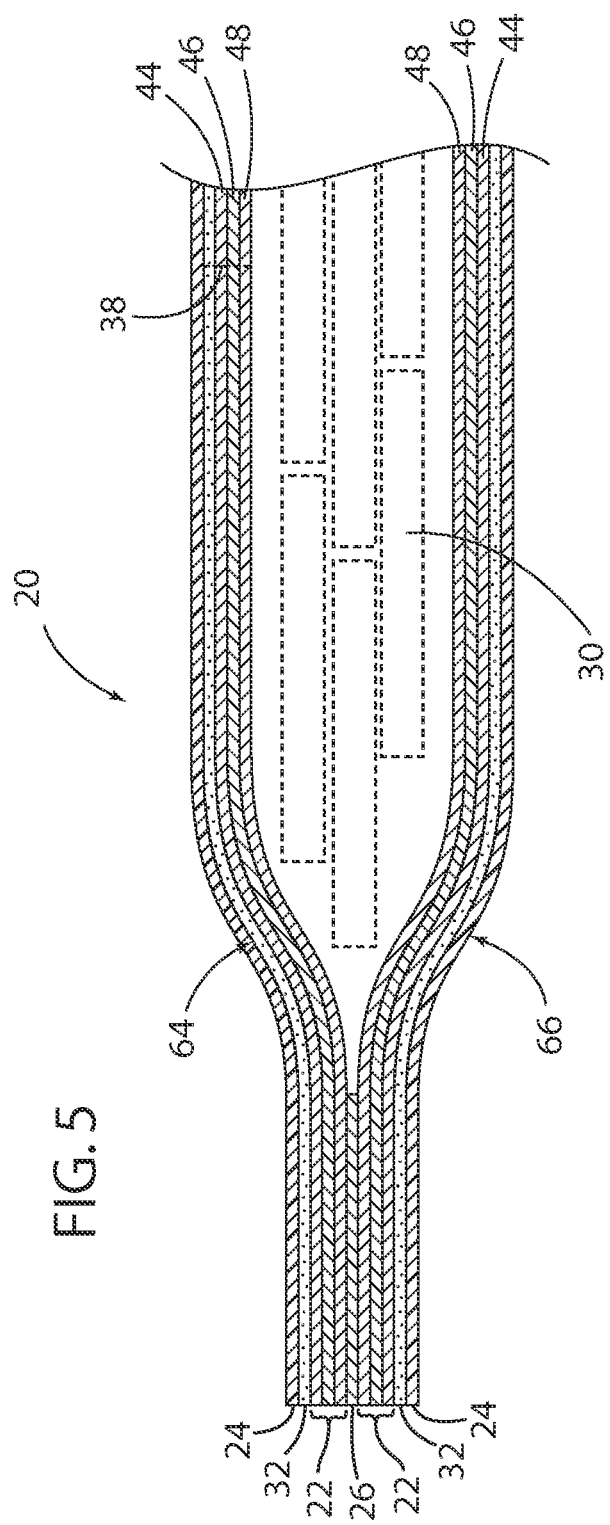

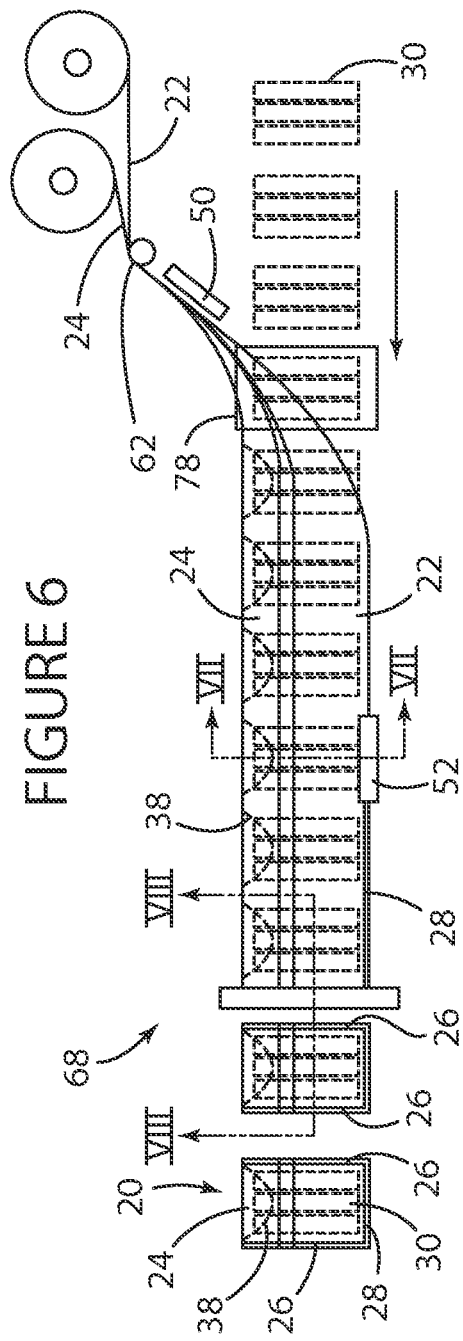
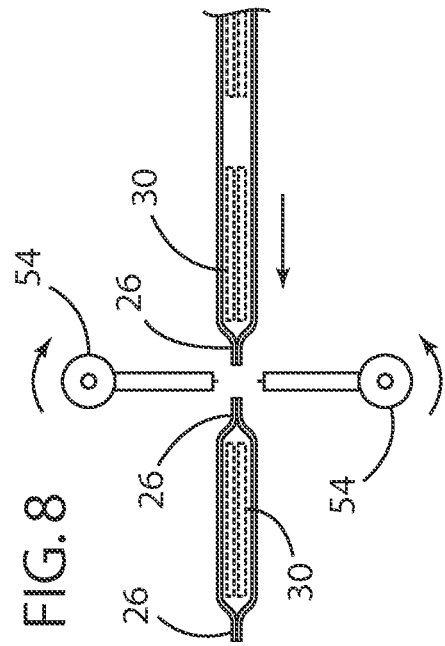
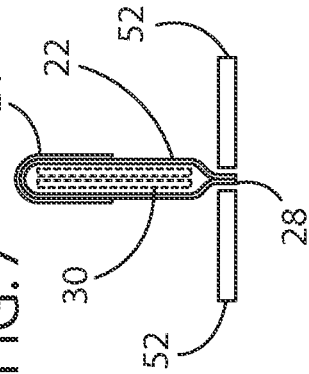

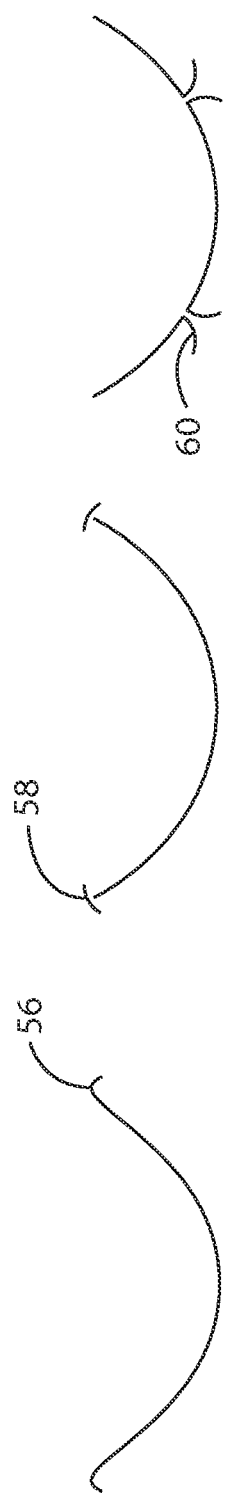
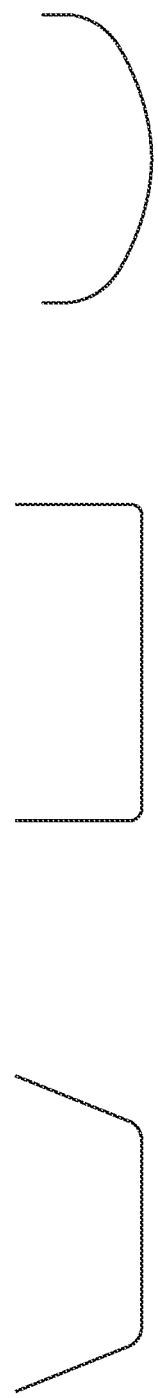
FIG. 9  FIG. 10  FIG. 11
FIG. 12  FIG. 13  FIG. 14
FIG. 15

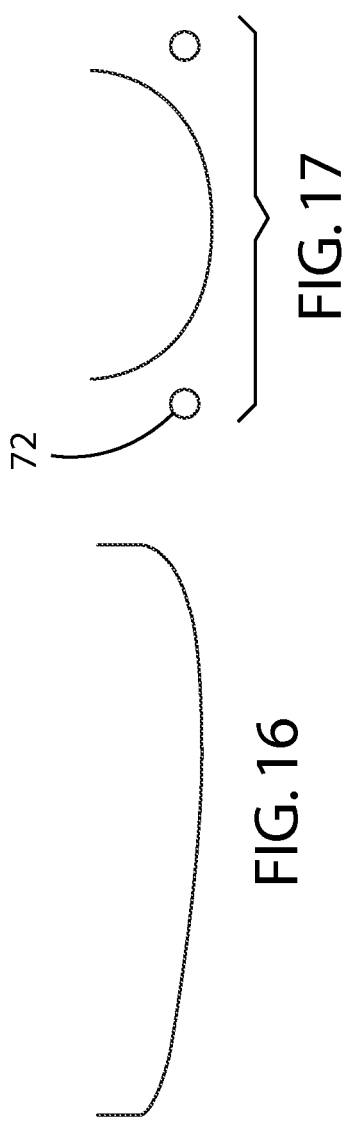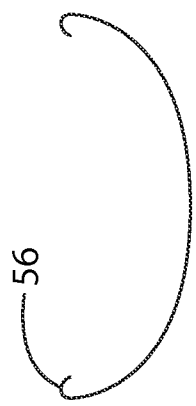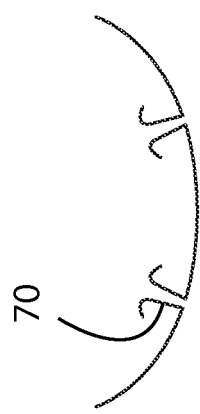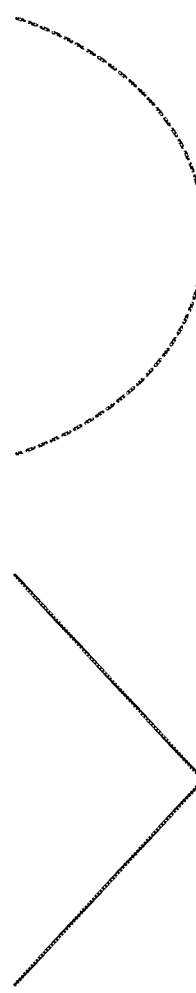
FIG. 16 FIG. 17 FIG. 18 FIG. 19 FIG. 20 FIG. 21

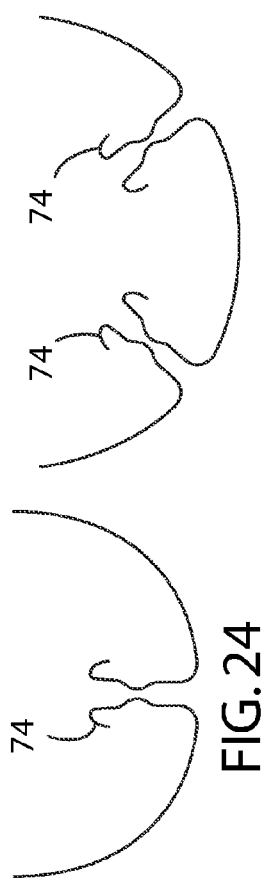
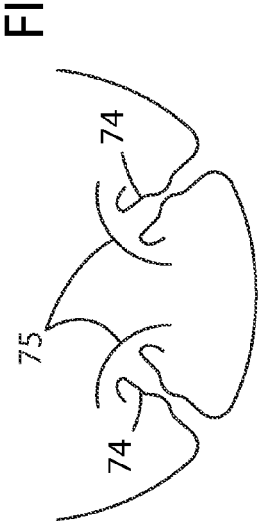
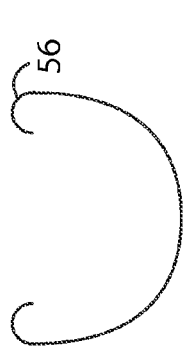
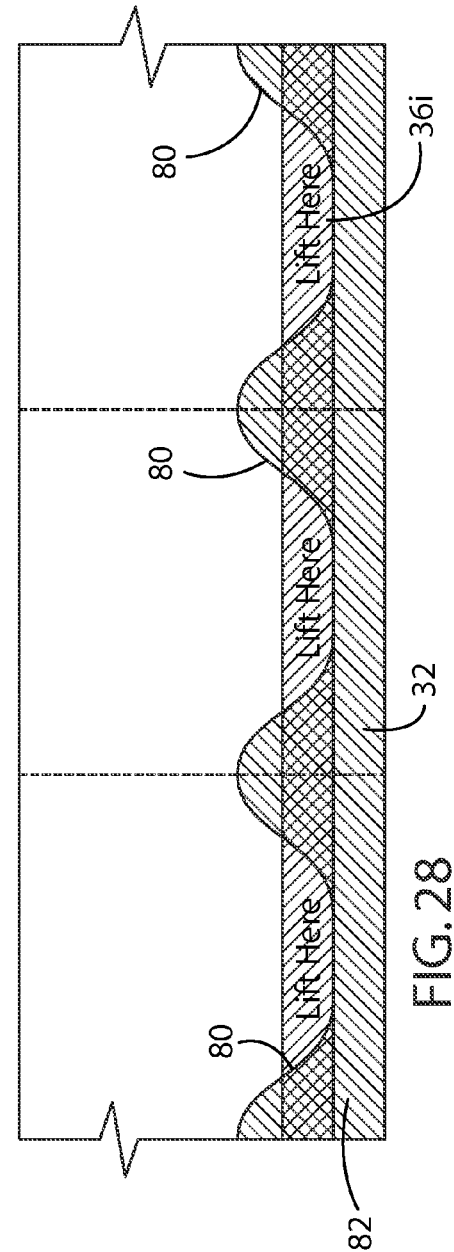

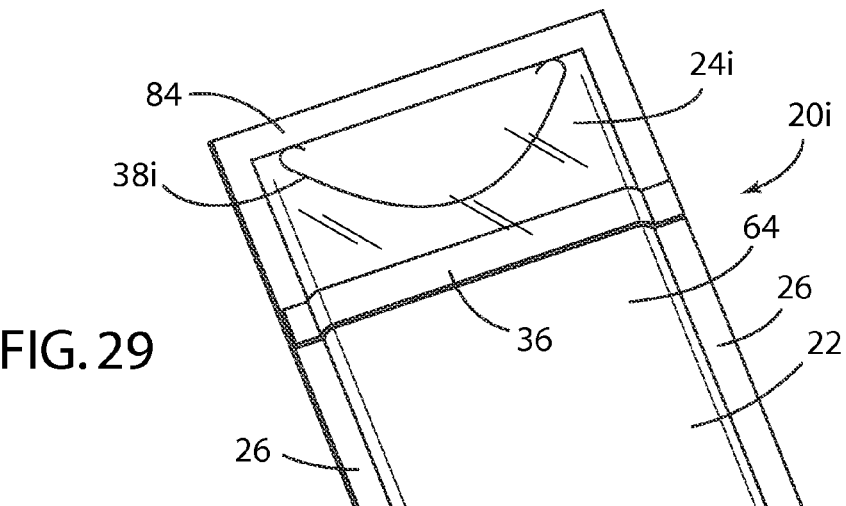
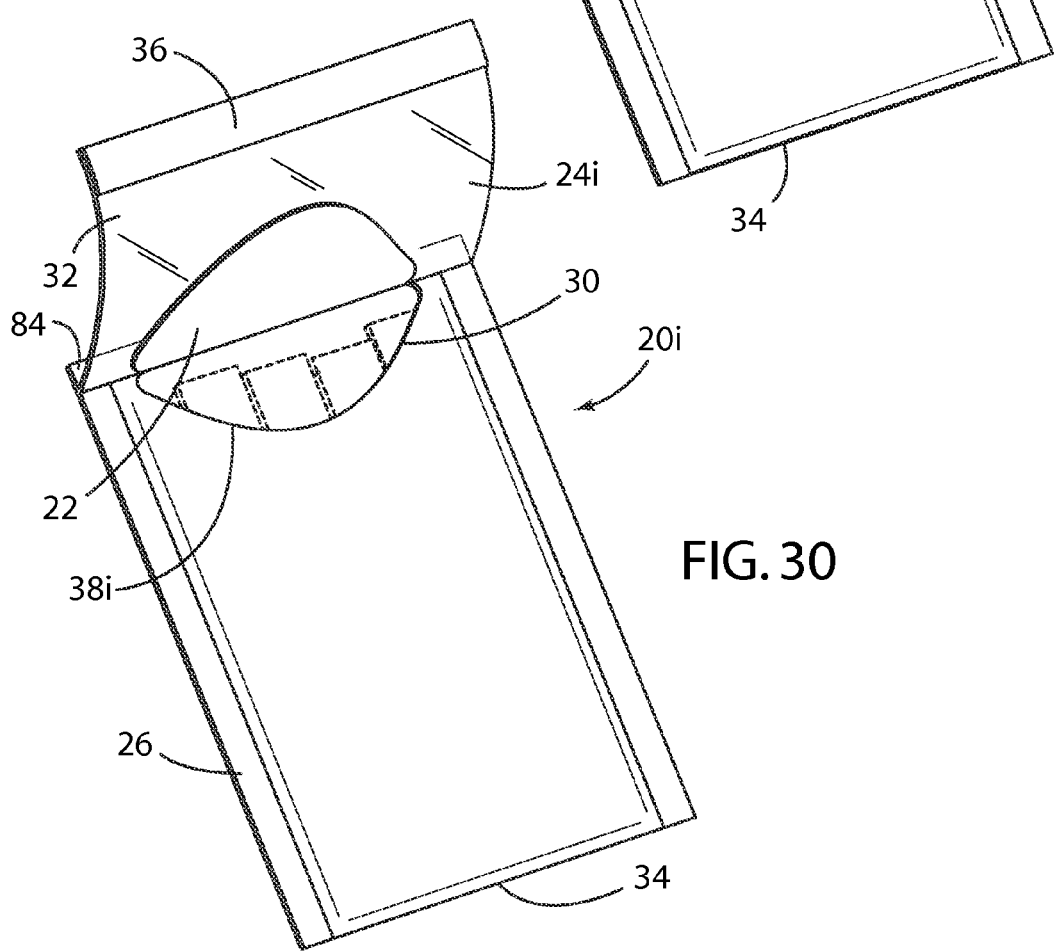

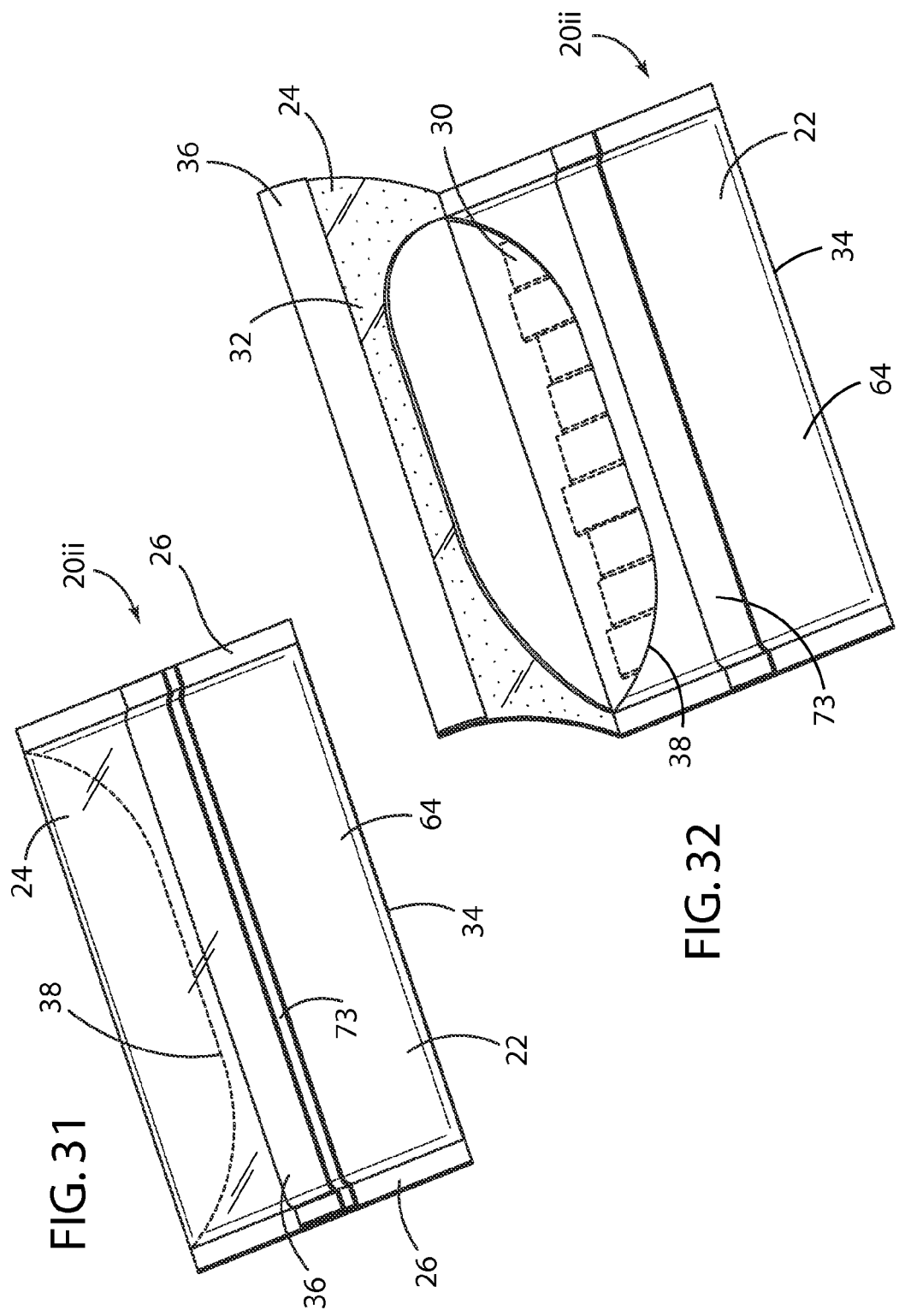

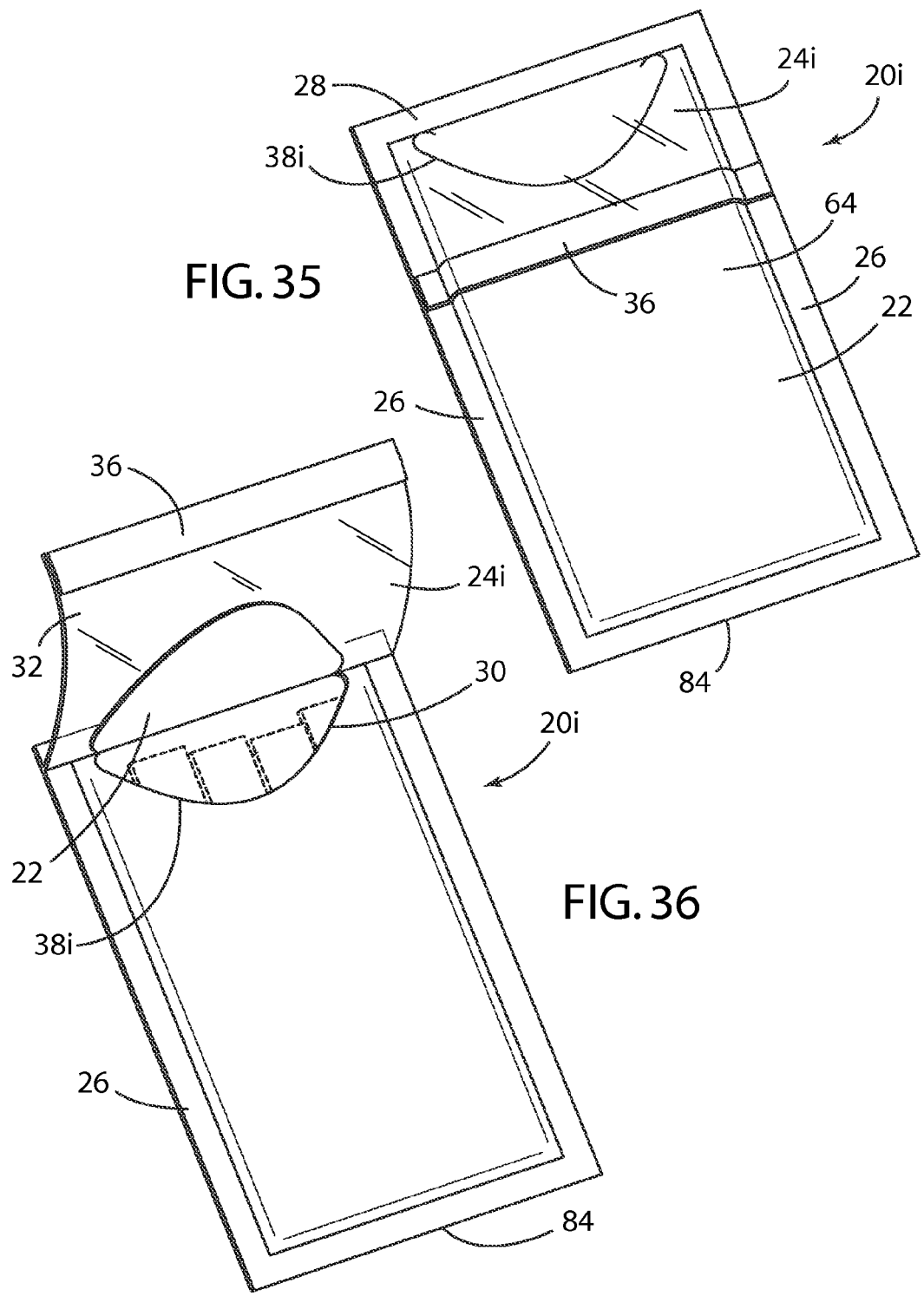

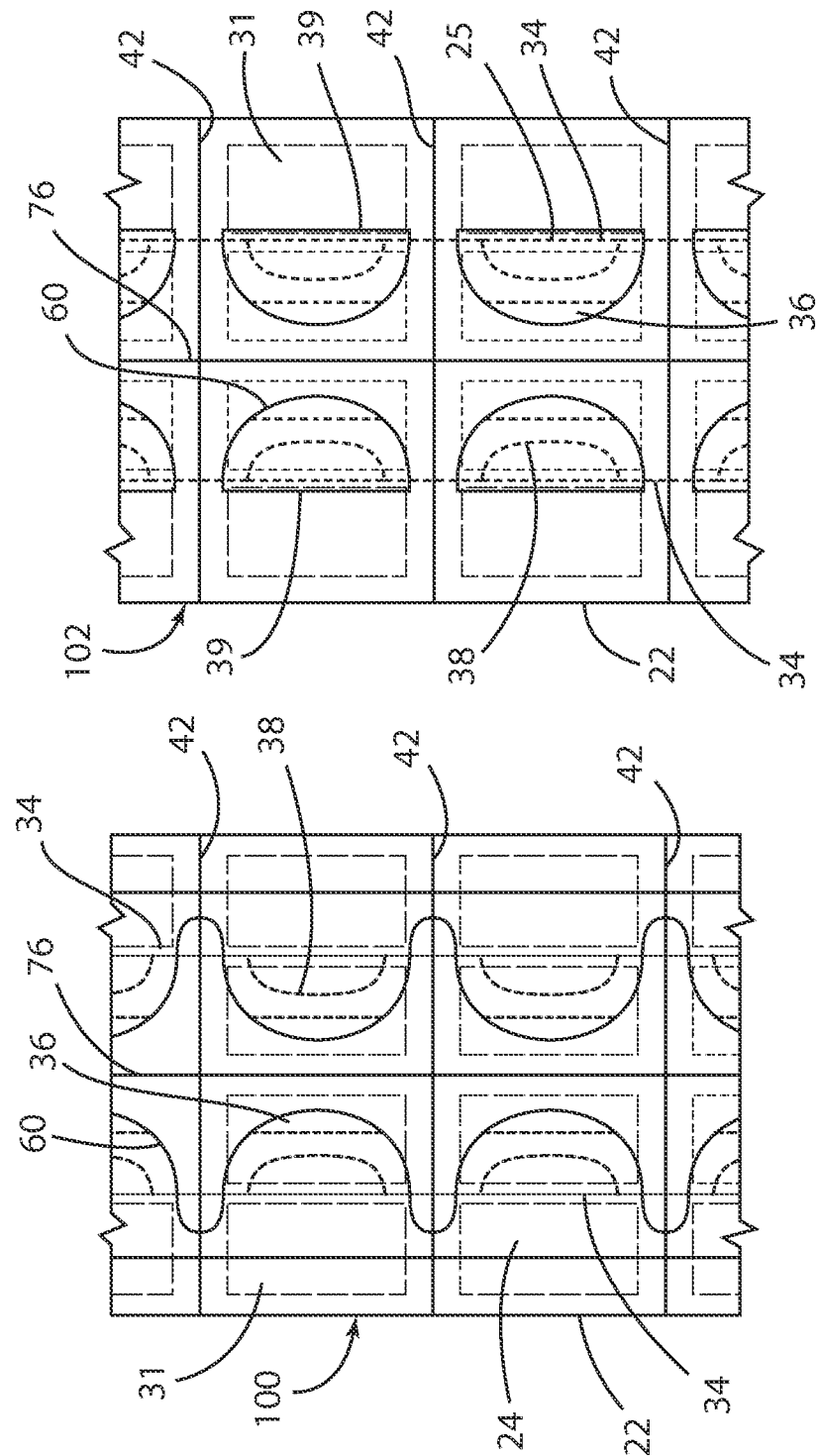

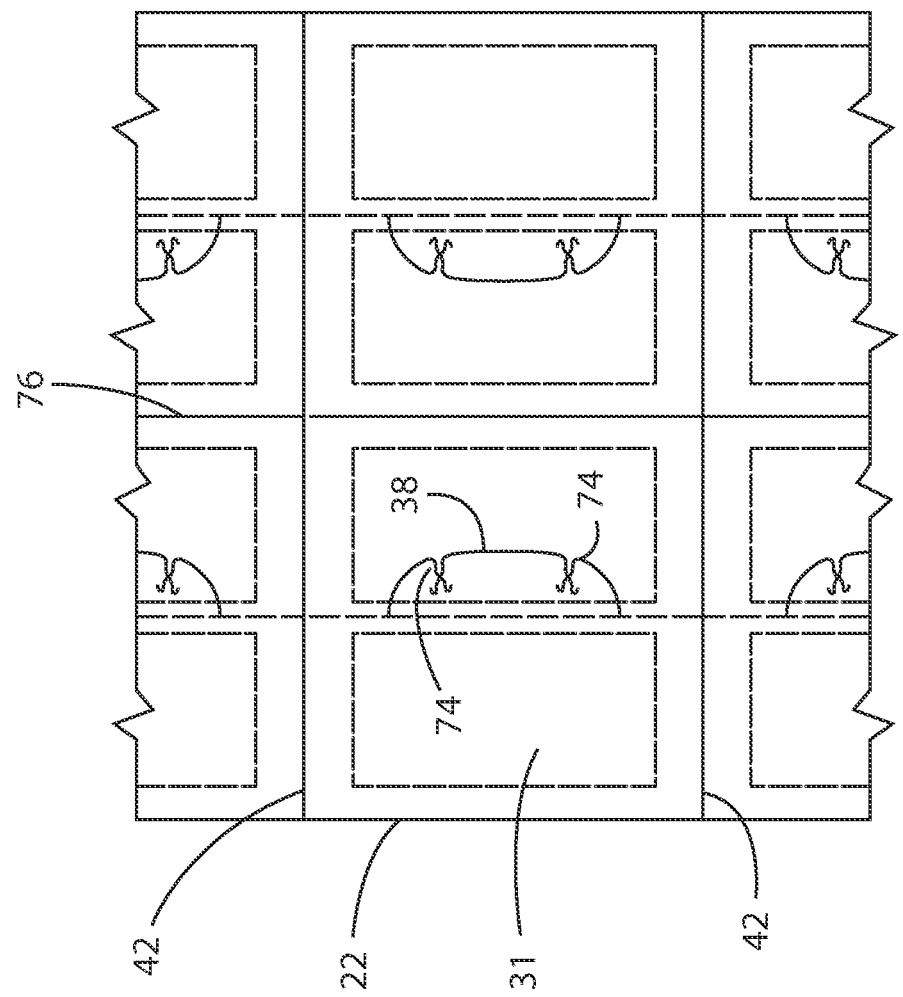

RECLOSABLE FLEXIBLE FILM PACKAGING PRODUCTS AND METHODS OF MANUFACTURE

CROSS-REFERENCE TO RELATED APPLICATIONS

This application is a U.S. National Phase application filed under 35 U.S.C. §371 of International Application PCT/US2012/029486, filed Mar. 16, 2012, designating the United States, which claims the benefit of U.S. Provisional Patent Application No. 61/453,872, filed Mar. 17, 2011, which is incorporated herein by reference in its entirety.

FIELD

The present products and methods relate to packaging and in particular to reclosable flexible flow-wrap packaging products and methods with a closure layer (label) over film having a line of weakness.

BACKGROUND

Flexible packaging is often used to retain and seal products for shipping and storage. It is commonly used for a variety of consumer products, including food products (e.g., cracker sleeves, chewing gum sticks, chocolate bars, cookies, and the like). By one approach, the package may be a film laminate and take the shape of the products contained therein. Packages can be formed by a plurality of walls sealed to form an interior cavity. Examples can include flow-wrap packaging, three-sided seals, form-filled seal, and the like.

Flow-wrap type flexible film packaging can use a continuous film (web) to envelop product during assembly. In one configuration, flow-wrap (also known as horizontal or vertical fin-seal or lap-seal wrap, end-seal wrap, horizontal bagging and pillow-pouch packaging) can position a film, such as polyethylene or polypropylene, adjacent a product, wrap the film around the product, form a seal from the ends of the film, then form seals at either side of the product. The seals can be permanent and provide some level of structural integrity. Flexible film packages have many other advantages. They can be manufactured at substantially lower cost than rigid containers, are light-weight resulting in reduced transportation costs, and pack easier resulting in less storage space.

Despite these advantages, flexible packaging can sometimes be difficult to open and is typically not suitable when a user wants to reclose/reseal a package after its initial opening, such as when there is more product within the package than for a single use. Attempts are known in the art to provide some measure of reclosure of flexible packaging using discreet closure layers (labels) that require precise label placement (registration) on the package over a configured opening in the film (See generally, U.S. Pat. No. 5,725,311 to Ponsi).

SUMMARY

Accordingly, provided herein are embodiments for an easy open flexible flow-wrap package film/web having a closure layer/label laminated above a score (tear) line in the flow-wrap film, which defines a package opening. A pressure sensitive adhesive (PSA) between the film and label can allow easy opening and reclosing or resealing, while maintaining package integrity.

In one embodiment, a reclosable flexible film package can have a flexible film having a fold forming a folded edge, at least two opposing free edges, and at least a front panel and a back panel, the opposing free edges being sealed together to form at least one sealed edge such that front and back panels define an interior space; a score in the flexible film of the front panel forming a flap that defines an opening when moved toward the folded edge and has a separation force for the flap from the film; and a label extending uninterrupted from edge to edge of the at least two opposing free edges, being attached on the film by pressure sensitive adhesive, and extending beyond the score on the front panel to reseal the package opening defined by the flap, the pressure sensitive adhesive having a peel strength between the film and the label that is greater than the separation force along the score, and the label further having a tack free portion defining a pull tab.

In some embodiments the label can extend beyond the folded edge to the back panel. The score line can be arcuate or a perforation. In some embodiments, the score line end can terminate in a tear propagating reduction pattern, such as a 'J-hook' or a 'smile'.

In some embodiments, the label can extend equidistant on the front and back panel from the folded edge. The film can be a printed overwrap film laminate having a reverse printed OPP clear film bonded to a white OPP package film. In some embodiments, the OPP clear film can be a gauge in the range of about 90-230 and the white OPP package film can be a gauge in the range of about 90-230. In some embodiments, the OPP clear film can be about 118 gauge and the white OPP package film about 118. The label can be a BOPP clear film of a gauge in the range of about 160 to 240. In other embodiments, the film can be a BOPP clear film of a gauge of about 200. By one approach, the non-adhesive edge of the label can be a portion of the label folded onto itself so that PSA surfaces are adjacent to one another.

In one approach, a reclosable package can have a first substrate forming a plurality of panels having peripheral edges sealed to form an interior cavity for receiving items; a flap defined by a line of weakness in at least a first panel that defines an opening to the interior cavity when the first panel is separated at the line of weakness; a second substrate adhered to the first substrate and having a first portion extending beyond the line of weakness to form a package reseal zone, and a second portion extending from a portion of the first panel to a portion of the second panel and wherein the second substrate extends uninterrupted from one peripheral edge to an opposite peripheral edge. In some embodiments the line of weakness can be a perforation. In other embodiments of this approach, the first substrate can be a printed overwrap film laminate comprising a reverse printed oriented polypropylene (OPP) clear film bonded to a white OPP package film. Also, in some embodiments, the OPP clear film can be a gauge in the range of about 48-230 and the white OPP package film can be a gauge in the range of about 48-230. In other approaches, the OPP clear film can be about 118 gauge and the white OPP package film is about 118; the second substrate can be a BOPP clear film of a gauge in the range of about 160 to 240; the first substrate can be a BOPP clear film of a gauge of about 200; and/or the non-adhesive edge of the second substrate can be a portion of the second substrate folded onto itself so that PSA surfaces are adjacent to one another.

In some embodiments, laminate for forming a closable flexible package can have a continuous web of flexible film having a longitudinal axis; a continuous label applied to the flexible film along the longitudinal axis with pressure sensitive adhesive; and the web and label forming a continuous series of similar package forming blanks, the flexible film of each blank having a line of weakness forming a flap in the film along the label to define an opening. In some embodiments, the score line can be continuous in the longitudinal direction along the web; arcuate; or sinusoidal. A portion of the label can be tack free to define a pull tab.

In some embodiments, a reclosable package can have a multi-layer laminate film, the laminate film having at least a sealant layer, a barrier layer, an adhesive layer, and a stiffening layer; a line of weakness formed in the multi-layer laminate film, the line of weakness defining at least in part a package opening; and a closure layer attached to the multi-layer laminate film with an adhesive and extending over the line of weakness.

In other embodiments, the laminate film can also have a polyester layer and an additional adhesive layer. In other embodiments, the laminate film further comprises a release layer. In still other embodiments, the stiffening layer can have a fiber substrate.

In other embodiments, a method for forming a reclosable flexible package laminate, can have the steps of providing a continuous web of flexible film having a longitudinal axis; applying a continuous label to the flexible film along the longitudinal axis with pressure sensitive adhesive (PSA); and scoring the web forming a continuous series of similar package forming blanks and forming a flap in the film along the label to define an opening. In other embodiments, the method can optionally add the step of applying a deadening label to the PSA forming a pull tab prior to the step of applying the continuous label to the flexible film. In other embodiments, the method can optionally add the step of removing a liner from the label to expose the PSA prior to the step of applying the continuous label to the flexible film. In other embodiments, the method can optionally add the step of scoring the label after the step of applying the continuous label to the flexible film; and removing the label score matrix. In other embodiments, the method can optionally add the step of folding the web over a product to create a folded edge; and forming a seal on the folded edge opposing free edges of the web to form front and back panels define an interior space to contain product. In other embodiments, the method can optionally add the step of cutting a seal to define an individual package.

In some embodiments, the apparatus to form a reclosable flexible film package can have a lamination roller to laminate a continuous web of flexible film having a longitudinal axis to a continuous label along the longitudinal axis with pressure sensitive adhesive (PSA); a first device to produce a line of weakness formed in the web after laminating the flexible film to the label, forming a continuous series of similar package forming blanks and forming a flap in the film along the label to define an opening; a folding device to create a folded edge over a product; and a sealing device to form a seal on the opposing free edges of the web folded edge to form front and back panels define an interior space to contain product. In other embodiments, the apparatus can optionally have a second scoring device to score the label after lamination to the web. In other embodiments, the apparatus can optionally have a cutting device to cut the seal to form an individual package.

In other embodiments, a package can be formed by a process having the steps of providing a film web; continuously applying a label web to the film web with adhesive; cutting the label web to form labels; removing the label web that does not form the labels from the film web; and forming lines of weakness in the film web corresponding to the labels to define package openings. The package can also be formed by separating the film web having the labels into package blanks: by wrapping the film web having the labels around a food product and forming individual flexible film packages; or by separating the film packages from one another. In some embodiments, the labels can each have a first portion including a pull tab, the first portion being disposed beyond the lines of weakness toward the pull tab. Optionally, the first portion of the shaped package labels further can have a reseal portion with pressure sensitive adhesive. In some embodiments, the labels can also have a second portion disposed beyond the lines of weakness away from the pull tab. In other embodiments, the second portion of the labels can include a pair of tabs. In some embodiments, the package can be formed with the additional step of folding the film web around a food product wherein the package can include a package fold and the pair of tabs of the second portion of the labels extend around the package fold.

In other embodiments, a method of forming a series of reclosable film packages can include the steps of providing a film web; continuously applying a label web to the flexible film web with adhesive; cutting the label web to form package labels removing the label web that does not form the labels; and forming lines of weakness in the film web corresponding to the labels to define package openings.

BRIEF DESCRIPTION OF THE DRAWINGS

FIG. 2 illustrates a perspective front view of an exemplary reclosable flexible film package of the present embodiments in a closed position;

FIG. 3 illustrates a perspective back view of an exemplary reclosable flexible film package of the present embodiments;

FIG. 5 illustrates a partial cross-sectional view of an exemplary recloseable flexible film package of the present embodiments taken along section lines V-V in FIG. 2;

FIG. 6 illustrates a side view of an exemplary in-line assembly process to form and package a product using a scored flexible film package of the present embodiments with a continuous label;

FIG. 7 illustrates a cross-sectional view taken along section line VII-VII of FIG. 6 of an end seal device of an exemplary assembly process to form and package a product using a scored flexible film package of the present embodiments with a continuous label;

FIG. 8 illustrates a cross-sectional view taken along section line VIII-VIII of FIG. 6 of a side seal and cut device of an exemplary assembly process to form and package a product using a scored flexible film package of the present embodiments with a continuous label;

FIG. 9 illustrates an alternate arcuate score line with an outward oriented J-hook configuration for an exemplary recloseable flexible film package of the present embodiments;

FIG. 10 illustrates an alternate arcuate line with 'smile' configuration for an exemplary recloseable flexible film package of the present embodiments;

FIG. 11 illustrates an alternate arcuate score line with pair of (package integrity features) PIFs outside the arc configuration for an exemplary recloseable flexible film package of the present embodiments;

FIG. 12 illustrates an alternate trapezoidal shape score line with rounded corners configuration for an exemplary recloseable flexible film package of the present embodiments;

FIG. 13 illustrates an alternate 'box shape' score line with rounded corners configuration for an exemplary recloseable flexible film package of the present embodiments;

FIG. 14 illustrates an alternate general arc score line with rounded edges configuration for an exemplary recloseable flexible film package of the present embodiments;

FIG. 15 illustrates an alternate generally straight cut score line for an exemplary recloseable flexible film package of the present embodiments;

FIG. 16 illustrates an alternate broad arc score line with straight sides having an offset distal tab end configuration for an exemplary recloseable flexible film package of the present embodiments;

FIG. 17 illustrates an alternate arcuate score line configuration with a pair of dimpled PIFs for an exemplary recloseable flexible film package of the present embodiments;

FIG. 18 illustrates an alternate arcuate score line inward oriented J-hook configuration for an exemplary recloseable flexible film package of the present embodiments;

FIG. 19 illustrates an alternate 'V' shaped score line configuration for an exemplary recloseable flexible film package of the present embodiments;

FIG. 20 illustrates an alternate arcuate and perforated score line configuration for an exemplary recloseable flexible film package of the present embodiments;

FIG. 21 illustrates an alternate arcuate score line with pair of PIFs inside the arc score line configuration for an exemplary recloseable flexible film package of the present embodiments;

FIG. 22 illustrates an alternate 'deep' arcuate score line inward oriented J-hook configuration for an exemplary recloseable flexible film package of the present embodiments;

FIG. 23 illustrates an alternate 'V' shaped score line configuration with a rounded point for an exemplary recloseable flexible film package of the present embodiments;

FIG. 24 illustrates an alternate arcuate score line with an alternate PIF inside the arc score line configuration for an exemplary re-closeable flexible film package of the present embodiments;

FIG. 25 illustrates an alternate arcuate score line with an alternate pair of PIFs inside the arc score line configuration for an exemplary re-closeable flexible film package of the present embodiments;

FIG. 26 illustrates an alternate arcuate score line with an alternate PIF inside the arc score line configuration having a tear propagation limiter for an exemplary re-closeable flexible film package of the present embodiments;

FIG. 27 illustrates an alternate arcuate score line with an alternate pair of PIFs inside the arc score line configuration having a tear propagation limiters for an exemplary re-closeable flexible film package of the present embodiments;

FIG. 28 illustrates a section of a label roll having a scored 'sine wave' shaped label edge configuration;

FIG. 29 illustrates a perspective front view of a first alternate exemplary re-closeable flexible film package of the present embodiments in a closed position;

FIG. 30 illustrates a perspective front view of a first alternate exemplary re-closeable flexible film package of the present embodiments in an open position;

FIG. 31 illustrates a perspective front view of a second alternate exemplary re-closeable flexible film package of the present embodiments in a closed position;

FIG. 32 illustrates a perspective front view of a second alternate exemplary re-closeable flexible film package of the present embodiments in an open position;

FIG. 35 illustrates a perspective front view of a second alternate exemplary re-closeable flexible film package of the present embodiments in a closed position;

FIG. 36 illustrates a perspective front view of a second alternate exemplary re-closeable flexible film package of the present embodiments in an open position;

FIG. 37 illustrates a planar view of a section of a film/label laminate prior to assembly of an exemplary re-closeable flexible film package according to one approach of the present embodiments;

FIG. 38 illustrates a planar view of a section of a film/label laminate prior to assembly of an exemplary re-closeable flexible film package according to one approach of the present embodiments;

FIG. 39 illustrates a planar view of a section of a film prior lamination of a label and prior to assembly of an exemplary re-closeable flexible film package according to one approach of the present embodiments;

DETAILED DESCRIPTION OF THE PRESENT EMBODIMENTS

Figure 1:
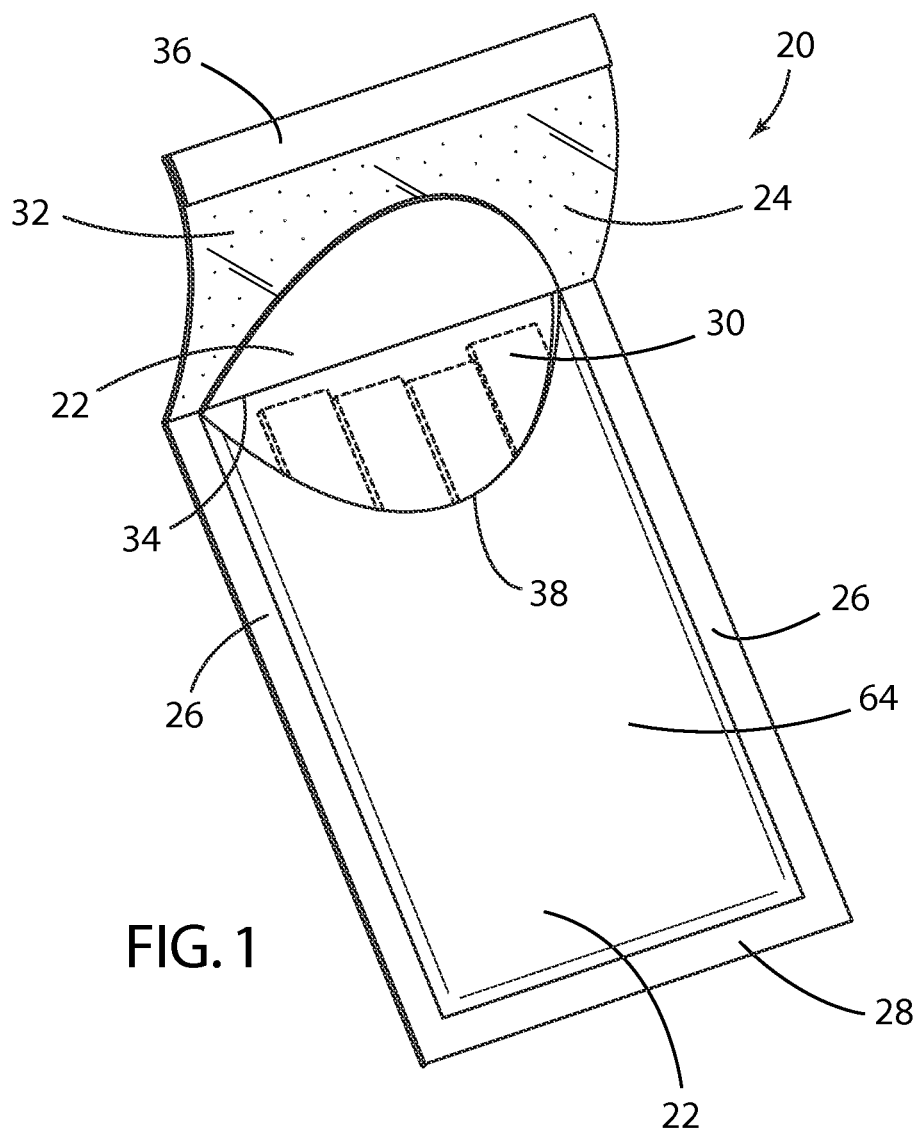
FIG. 1 illustrates a perspective front view of an exemplary reclosable flexible film package of the present embodiments in an open position.

Provided herein are various embodiments of an easily opened and reclosable package having in some embodiments a front and back panel formed by a flexible film web substrate having a closure layer or label substrate disposed thereon. The label can be applied continuously to the film. In some embodiments the label can be top cut to form a shaped continuous label or even a discrete label package from a continuously applied label. The reclosable packages can be easily opened and reclosed while maintaining package integrity. By one approach, the reclosable packages are formed with a flexible film laminated with a continuous label by a pressure sensitive adhesive. In one configuration, an illustrative four-sided package is comprised of a folded web of flexible film that forms the front and back panels having four peripheral edges—one folded edge and three sealed edges.

In such a configuration, no fin or lap seals are needed. By one approach, the label can extend beyond one panel of the reclosable package and may extend on both sides of a film peripheral edge (e.g., the edge seal or the fold line). In one aspect, the label extends beyond a preconfigured score line (i.e., a tear line or line of weakness) formed in the web on a first edge. It is noted that a line of weakness can include any effort to compromise film integrity which may include a complete separation of the film (e.g., FIG. 15).

On a surface of the continuous label facing the flexible film web, the continuous label may have an adhesive-free area (e.g., along all or a portion of the first edge) to provide a pull tab to facilitate easy opening of the package. Further, such adhesive-free pull tab may be disposed on a side of the package with the score line such that the adhesive-free pull tab is disposed proximate the package opening or flap. The adhesive-free pull tab may be formed by creating a deadened area of the PSA. In one approach, the PSA is deadened on a portion of the surface of the continuous label by folding the over a portion of the label. A second edge of the label can extend over a peripheral edge to a portion of an adjacent panel (e.g., the back panel). It is noted though that in other configurations more than two panels may be present, such as a box having six panels. In this instance the adjacent panel over which the label extends may be a top, side or bottom panel.

Although the present embodiments are described for a label laminated over a score line of a flexible web, several variations are provided within the scope of these embodiments. For example, as described herein, the package can be configured to 'reclose' for product containment after initial opening. It is noted that in some embodiments, the reclose feature can also 'reseal' the package. In other words, the package can be hermetically resealed (or near to hermetically sealed) to maintain product freshness and/or protect against moisture loss. This reseal feature can be beneficial for package embodiments that can have an initial seal against ambient atmosphere (e.g., provide a gas and moisture barrier). A reseal feature can extend the time of product freshness.

It is further noted that the present embodiments can be applied to a variety of package designs using a variety of package materials. For example, a four-sided package is described, though the package can be round, oval, or have any number of sides, side seals, folded edges, shapes, and combinations thereof. Also, a two-paneled package is described, though the package can include a multiplicity of panels (such as a box), round sleeves (such as for a round sleeve of crackers), and the like. Package materials can include various polymer laminate films described herein, as well as, paper, paperboard, paper poly-foil laminate, coated polymers, coated paper (e.g., wax paper), and the like, and combinations thereof. Although the present embodiments are described for food product and chewing gum applications, the embodiments can equally be applied to non-food applications such as, medical, pharmaceutical, industrial package applications.

Turning now to the Figures, there is shown in FIGS. 1-3 one configuration of the present package embodiments generally indicated at 20. As generally shown, package 20 can be formed from a film substrate (web) 22 laminated to a closure layer substrate (label 24) by a pressure sensitive adhesive PSA 32. It is noted that while the package is described as a PSA adhesive, other types of adhesives can be used including a portion having a permanent adhesive, and the like and combinations thereof. Package 20 can, for illustrative purposes, have two panels (front panel 64, rear panel 66) and peripheral edge portions, such a two side seals 26, an end seal 28 and a folded film edge 34. In any event, side seals and folded film edges form sealed peripheral edges. Film 22 can have a score line (tear line/line of weakness) 38 covered by label 24. Label 24 can have a non-adhesive area 36 formed by a variety of methods described herein to facilitate easy opening to expose product 30.

The illustrated flexible flow-wrap embodiments described herein generally include a package designed for multiple servings, formed from a scored flexible material having two (2) side seals and an end seal which form front panel 64 and back panel 66. The seals, which can be hermetic (or substantially hermetic) seals and can be formed by processes of hot seal, cold seal, sonic waves, low tack seal, and combinations thereof, and are preferably non-peelable. Embodiments can provide not only a light barrier, but can also be configured to provide a gas and moisture barrier for up to 24 months prior to opening. In some embodiments, such as for chewing gum, the package can be configured to maintain product freshness from between six to 18 months. Given the flexibility of the laminate film, package shape is typically influenced by the product contents.

Package 20 can be formed by joining opposite sides of the film 22 to form end seal 28. In one approach, the package can be formed by a film label laminate to allow for parallel formation of packages in multiple lanes (e.g., two lanes shown in FIG. 45). Film 22 can have a sealant layer on an interior surface of the film, described below. Side seals 26 can also be provided.

Alternate package embodiments can be found in FIGS. 29-30, 31-32, 46-47 and 54-55. In FIGS. 29-30, a continuous label 24*i* can be applied along the longitudinal axis of front panel 64 over a score line that is oriented to open towards end seal 28. In one approach, a score line 38*i* has a medial 'J-hook' configuration to reduce tear propagation beyond the score line. The 'J-hook' can be configured for placement at or approaching the inward edge of end seal 28. An additional seal can be applied to secure label 24*i* in the region of end seal 28 (not shown). For example, additional heat or sealant could be applied to seal label 24i in the region of end seal 28 to make it a non-peelable seal.

In FIGS. 31-32, and 54-55 a flow wrap package is shown having a fin seal 73. Optionally, a lap seal could also be used. Again, a label (which may be continuous or discretely disposed on the package) can be continuously applied to the longitudinal axis of the panel having the fin (or lap) seal. Alternately, the label can be continuously applied to the longitudinal axis of the package panel not having the fin (or lap) seal. It is again noted that this embodiment and others disclosed herein can be applied to any number of package and product configurations.

As used herein, continuous application of the label, flexible film, or adhesives indicates that the application of these is uninterrupted along the direction of application. Further, as used herein, a continuous package label may extend the entire length or width of the package and is uninterrupted from one edge of the package to an opposing edge. Alternatively, a discrete package label is one that covers only a portion of the width and length of the package and does not extend across the entire width or length of the package. By one approach, a continuous label web may be continuously applied to a film web, which is then formed into packages having a continuous package label. By another approach, a discrete package label may be applied in a continuous application such that a continuous label web is applied to a film web. In such a configuration, a label cut, such as a top cut, may be formed in the continuously applied label web. The label cut may define a shaped package label and the portion of the continuously applied label that does not form the shaped package label (i.e., the unused label matrix) may be removed from the flexible film web. Thus, a portion of the continuously applied label web may be removed from the film web to thereby form discrete package labels disposed on the film web.

FIGS. 35-36 illustrate a third alternate embodiment of a package of the present embodiments having all four sides sealed. This includes the addition of a second end seal 84.

Figure 46:
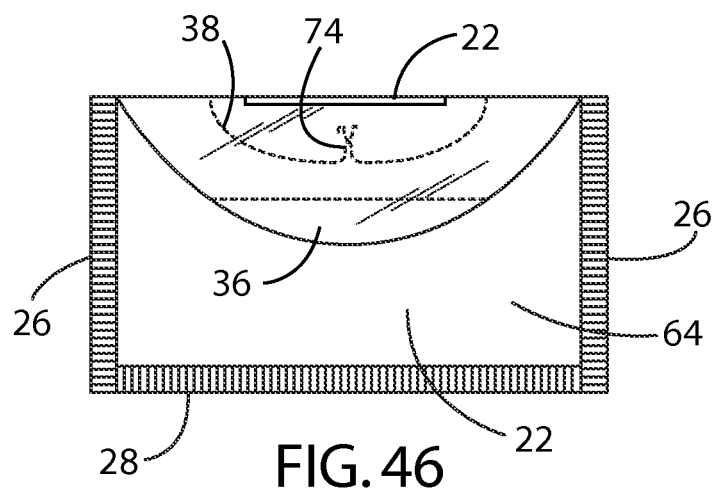
FIG. 46 illustrates a perspective front view of an exemplary re-closeable flexible film package according to one approach of the present embodiments in a closed position.
Figure 47:
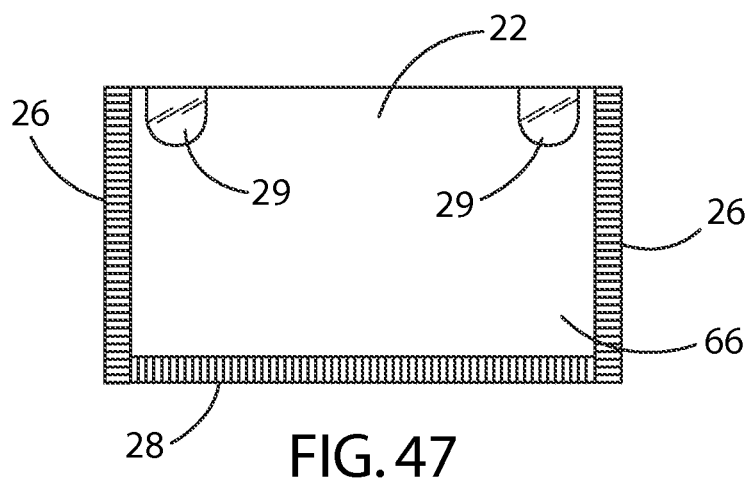
FIG. 47 illustrates a perspective back view of an exemplary re-closeable flexible film package according to one approach of the present embodiments.

FIGS. 46-47 illustrate another approach of a package of the present embodiments having three seals and a discrete label extending over a portion of the fold line.

In the present embodiments, film 22 can be formed from a variety of materials and laminations. Film 22 may be a laminate with several layers such as a polyethylene terephthalate (PET) layer and an oriented polypropylene (OPP) layer, or optionally be a single layer polymer. Examples of a single layer polymer can include polypropylene, polyethylene, polylactic acid (PLA), polyester, and the like. A PET layer can be flexible to semi-rigid, depending on its thickness. PET may be employed because it is very lightweight, strong, and can have high transparency when desired for package specifications. It can also be useful as an oxygen (gas) and moisture barrier. An OPP layer can add further strength and be a further barrier to permeability. Lamination components can be joined by adhesives or by extruded polymers. Film 22 can be a flexible sheet material rolled or formed as a blank and made of laminated or co-extruded film structures. Generally film 22 can be in the range of about 30 to 500 gauge. In embodiments using a polyester film, the film should be at least 48 gauge.

Film thickness can also be a function of the desired barrier to gas, moisture, and light, level of desired structural integrity, and the desired depth of the score line (described below). Further, film gauge (and label gauge) can be selected based on the desired package rigidity. In embodiments where the label extends beyond a fold line to a back panel, the label can provide further package rigidity.

Film 22 can be a heat sealable copolymer. In some embodiments, the heat sealable polymer forms a seal between 50 and 300 degrees Celsius. Film 22 can also be a pressure sealing film. In some embodiments, this pressure sealing film forms a seal between a pressure of about 0.7 and 7.0 Kg/cm, and preferably at about 5.6 Kg/cm.

Film 22 can optionally also have additional laminate layers. An optional sealant layer (See seal 26, FIG. 5; seal 94 in FIGS. 43 and 44) can be laminated to facilitate the formation of seals that enclose product during packaging. As such, the sealant layer would be oriented on the film surface directed to the interior of the package and can be applied as an extrusion laminate or as an adhesion laminate to film 22. The sealant layer can be a variety of polymer sealants such as a heat activated polymer sealant layer like polyethylene, ethylene vinyl acetate (EVA), ionomer (such as one sold under the trade name SURLYN by DuPont), matallicine catalyzed polymer, and the like. Particulate components can also be added to the sealant layer such as organoclay, antiblock, a slip component such as erucamide, polybutylene, and the like. Sealant layer 26 and 94 can be about 20 microns in thickness. Cold sealant and pressure sealants are also possible within the scope of the presented embodiments. It is noted that food grade sealants would be used when food products are anticipated. Sealant layer 26 could cover the entire interior surface of film 22 or just where the seals are needed (as shown in FIG. 5). Optionally, where a sealant layer is not provided, sufficient heat can be applied to the polymer to fuse/melt the film together to form a seal.

Stiffeners can be added to film 22 compositions, such as a polyamide polymer (e.g., nylon) and fibrous compositions such as paper. The stiffeners can be added as a component of the extruded film or as a separate layer. Nylon can be added as a laminate layer held to the film structure by an adhesive, optionally with film attached on each side of the nylon (i.e., tie layer). For illustrative purposes, the nylon layer can be about 8 percent of the film thickness or about 0.004 mm.

Optional film layers can also include ink layers (not shown). For example, one specific laminate can include ink and a primer disposed between a PET and OPP layer. Metalized layers, paper and paperboard layers, and various other combinations of laminates are also possible within the preferred embodiments.

As shown, film 22 can be shaped into a pouch or sleeve type package having square edges, though the embodiments can also be practiced in various curvilinear shapes such as rectilinear (sleeves) or oval packages depending on the desired product contained therein.

Turning now to FIG. 5, a cross section of a possible film laminate 22 of the present embodiments is shown to include a polyethylene terephthalate (PET) layer 44, a polyethylene (PE) layer 46, and an optional metalized oriented polypropylene (MET OPP) layer 48. PET layer 44 can be flexible to semi-rigid, depending on its thickness. PET is preferred because it is very lightweight and strong and has high transparency. It can be useful as an oxygen (gas) and moisture barrier. PE layer 46 can add further strength and be a further barrier to permeability. In the illustrated embodiment, MET OPP 48 can provide additional thermal insulation, film opacity, and the like. Preferably, the lamination components are joined by adhesives or by extrusions.

One laminate embodiment can be as follows: about 48 gauge PET/ink/about 70 gauge LDPE (or about 10 pounds)/about 70 gauge MET OPP. LDPE is a low density polyethylene. Other film lamination and label compositions are possible within the scope of these embodiments, so long as the package and label integrity can be maintained after repeated uses. For example, PET, LDPE and MET OPP components can each be in the range of about 5 to 500 gauge. Also, multiple variations of PET, PE, BOPP (biaxially oriented polypropylene) and MET OPP are also contemplated for the configurations presented herein.

In an alternate embodiment, film configurations can include a printed overwrap film of about 48-230 gauge (preferably about 118 gauge) OPP Clear film that is reverse printed and adhesively bound to about a 48-230 gauge (preferably about 118 gauge) white OPP package film.

Figure 43:
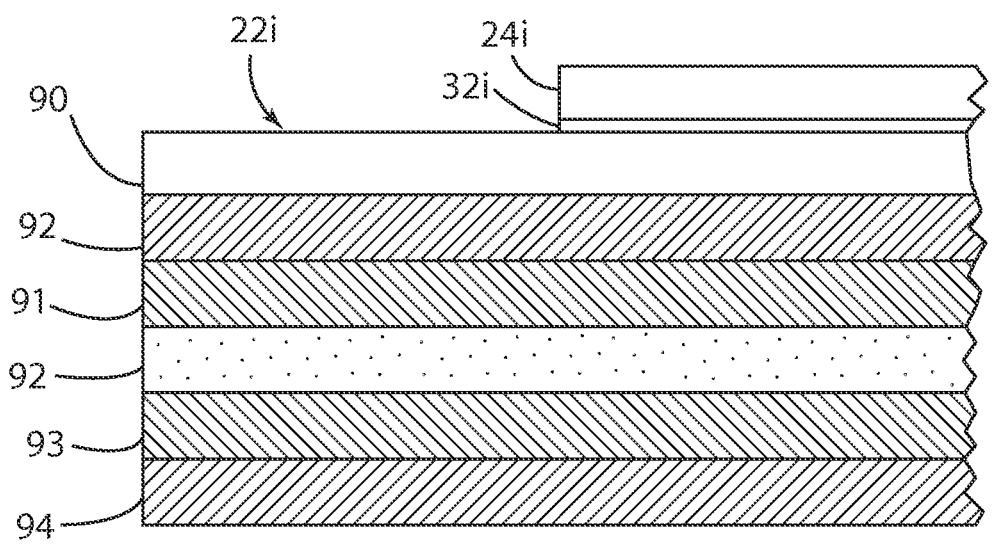
FIG. 43 illustrates a partial cross-sectional view of a section of a film/label laminate an exemplary re-closeable flexible film package of the present embodiments taken along section lines XLIII/XLIV-XLIII/XLIV in FIG. 42.

In another approach, as shown in FIG. 43, film 22i can have 6 layers. In this approach, label 24i is bound to a polyester layer 90 by a PSA 32i. Polyester layer 90 can be printed on either side and include a clear polyester, OPP, or even biaxially oriented nylon. As shown in this approach, layer 90 is configured to be oriented to the outside/exterior of the formed package. Layer 90 can in the range of about 18 to 120 gauge, though preferably in the range of about 20 to 50 gauge. Ink layers and even White LDPE can be applied to layer 90 on the surface oriented to the interior of the package.

Beneath polyester layer 90 can be an optional adhesive layer 92 to bind an optional stiffening layer 91, such as a fiber substrate (e.g., paper or even paperboard layer). Stiffening layer 91 can be paper in the range of about 18 to 80 grams per square meter (gsm), but preferably in the range of about 35 gsm to about 45 gsm, and most preferably about 40 gsm. Adhesive layer 92 can optionally be an extrusion or olefin or the like. Beneath polyester layer 90 (or optional stiffening layer 91) a second adhesive layer 92 can be disposed or even polyolefin in embodiments using extrusion lamination. In the approach second adhesive layer 92 bonds layer 90 (or 91) to a barrier layer 93. Barrier layer 93 can be a foil in the range of about 12 to 40 gauge, though preferably about 29 gauge. Barrier layer 93 can also be a metalized oriented polypropylene (MET OPP) layer. Below foil layer 93, a sealant layer 94 can be applied, which can include a polyolefin. Sealant layer 94 allows binding of opposing film layers to form, for example the package's end and side seals.

Figure 44:
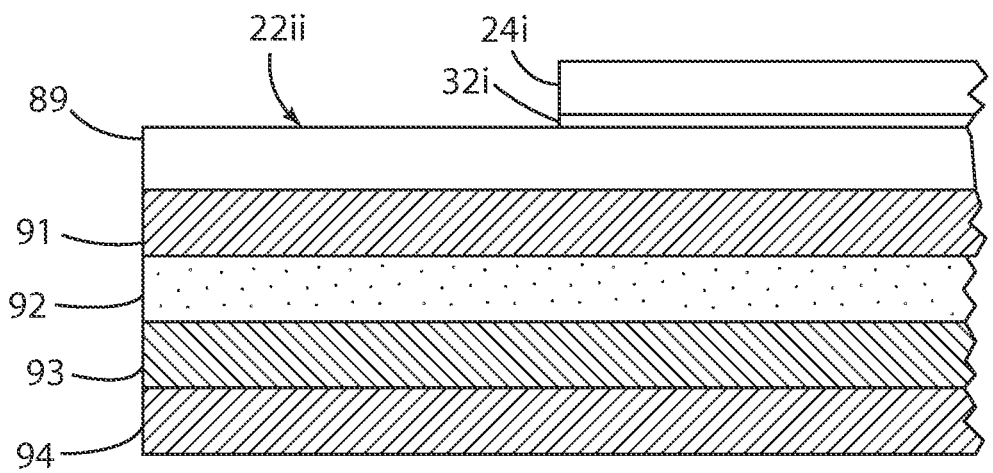
FIG. 44 illustrates a partial cross-sectional view of a section of a film/label laminate an exemplary re-closeable flexible film package of the present embodiments taken along section lines XLIII/XLIV-XLIII/XLIV in FIG. 42.

FIG. 44 illustrates another film substrate lamination approach indicated as 22ii. In this approach, label 24i is bound to a release layer 89 by a PSA 32i. Release layer 89 is bound to paper layer 91. Release layer 89 can be a silicone top coat, or varnish coat, such as used to cover a surface print. In embodiments where silicone is used, layer 89 thickness can be in the range of about 20 to about 50 gauge. Where a varnish is used, such as a print varnish, layer 89 thickness can be in the range of about 1 gauge to about 15 gauge. Release layer 89 facilitates smooth release of the PSA from a package surface over multiple uses. Paper 91 can bound to a barrier layer 93 by an adhesive layer 92. Sealant layer 94, which is directed to the film surface towards the package interior, can be bounded to the other side of barrier layer 93 as a co-extruded layer or as an extruded layer. In this approach the ranges of laminate layers can be comparable to those described for FIG. 43.

The present embodiments can also provide a line of weakness in the film substrate to define a package flap (e.g., FIGS. 9-27) or package opening (e.g., FIGS. 15, 49-53) that is disposed under label 24. Package integrity features (e.g., FIGS. 11, 17, 21, 24-27) can also be included. Preferably, score line 38 only goes through a portion of the film so as not to affect desired barrier properties (e.g., gas or moisture) of the package. Thus, label 24 would not need to provide the initial hermetic barrier, though optionally, it can. For example, for the opening of FIG. 15, the label could provide the initial barrier. The optional barrier properties to label 24 could result from inherent characteristic of the label material, or through an added barrier layer to label 24. It is noted that even in embodiments where score 38 can affect barrier qualities of film 22, the application of label 24 can compensate for the compromised barrier created by the score.

Scoring the film is not limited to a gauge of material or composition. Thus, the resulting product is cost effective. It is again noted that the term 'score' as used herein can be used to describe the effect of any type of process, such as by mechanical, laser or other processes that would provide a line of weakness to compromise the integrity of the film substrate. Score 38 can be cut through the exterior or interior surface of film 22, but preferably on the interior surface. It is also noted that the score need not be continuous to form a line of weakness. In some embodiments, a series of perforations of various sizes can be scored into film 22.

The preferred tear strength of score line 38 should be at least weaker than the adhesive strength of the PSA 32 (FIGS. 1 and 5) of label 24 to allow film 22 to peel back with the label (FIG. 1). For illustrative purposes only, in one embodiment, the PSA 32 can be configured to have an opening (separating) force of about 300-400 grams/sq inch and a closing (adhering) force of about 200-300 grams/sq inch. It is noted though that other opening and closing force ranges are contemplated for these embodiments.

Score line 38 can be arcuate as illustrated in FIGS. 1-4, but can be configured in many embodiments depending on the anticipated product and how much product is desired to be exposed when the package is opened. For example, FIGS. 9-27 show several different score 38 configurations. FIG. 9 illustrates an arcuate score line with an outward oriented J-hook configuration. FIG. 10 illustrates an arcuate score line with a 'smile'. FIG. 11 illustrates an arcuate score line with package integrity features (PIFs) outside the arc. FIG. 12 illustrates a trapezoidal shape score line with rounded corners. FIG. 13 illustrates a box shape score line with rounded corners. FIG. 14 illustrates an alternate general arc with rounded edges score line. FIG. 15 illustrates an alternate generally straight cut score line separating the film. In this instance, the score line can be positioned at or near the top fold line and therefore in this embodiment, the package peripheral edge is not sealed. This cut is not limited to within the limit of the seal but can be across the entire edge of the package and can be scored to separate the film prior to opening. This type of configuration can be used for product containment. Many other types of configurations are possible. FIG. 16 illustrates a broad arc score line with straight sides having an offset distal tab end. FIG. 17 illustrates an arcuate score line with a pair of dimpled PIFs. FIG. 18 illustrates an arcuate score line having an inward oriented 'J'-hook. FIG. 19 illustrates a 'V' shaped score line. FIG. 20 illustrates an arcuate and perforated score line configuration. FIG. 21 illustrates an arcuate score line with pair of PIFs inside the arc. FIG. 22 illustrates a 'deep' arcuate score line having inward oriented 'J'-hooks. FIG. 23 illustrates an alternate generally 'V' shaped score line configuration. FIG. 24 illustrates an alternate arcuate score line with an alternate PIF inside the arc. FIG. 25 illustrates an alternate arcuate score line with an alternate pair of PIFs inside the arc. FIG. 26 illustrates an alternate arcuate score line with an alternate PIF inside the arc score line configuration having a tear propagation limiter 75. And, FIG. 27 illustrates an alternate arcuate score line with an alternate pair of PIFs inside the arc score line configuration having a tear propagation limiters 75.

Some embodiments described above attempt to address a tendency that exposed score lines tend to propagate a continued tear beyond the end of the score line. FIG. 9, has a distally extending 'J-hook' 56, while FIGS. 18 and 22 have a medially extending 'J-hook's 56 to stop tear propagation. Alternately, FIG. 10 has a 'smile' 58 to provide this reduction in tear propagation.

Some embodiments have a package integrity feature (PIF). For example, FIG. 11 provides a tab or two tabs outside of the arc that form a break in the score line. The tabs are severed upon initial opening of the package, and will not overlay the same when the package is reclosed. An alternate PIF configuration 70 in FIG. 21 is directed inward from the arc. A second alternate PIF 74 is illustrated in FIGS. 24-27. These can be formed with additional features, such as a 'T-hook' or 'J-hook' on the end to stop or reduce tear propagation. Still another PIF configuration is shown in FIG. 17. This PIF includes a pair of dots/dimples scored in the film in the sealing area. Dots 72 are removed from their original position upon initial opening of the package. Upon reclose, the dots will not align perfectly into their original position and, therefore, indicate that the package was previously opened.

Figure 34:
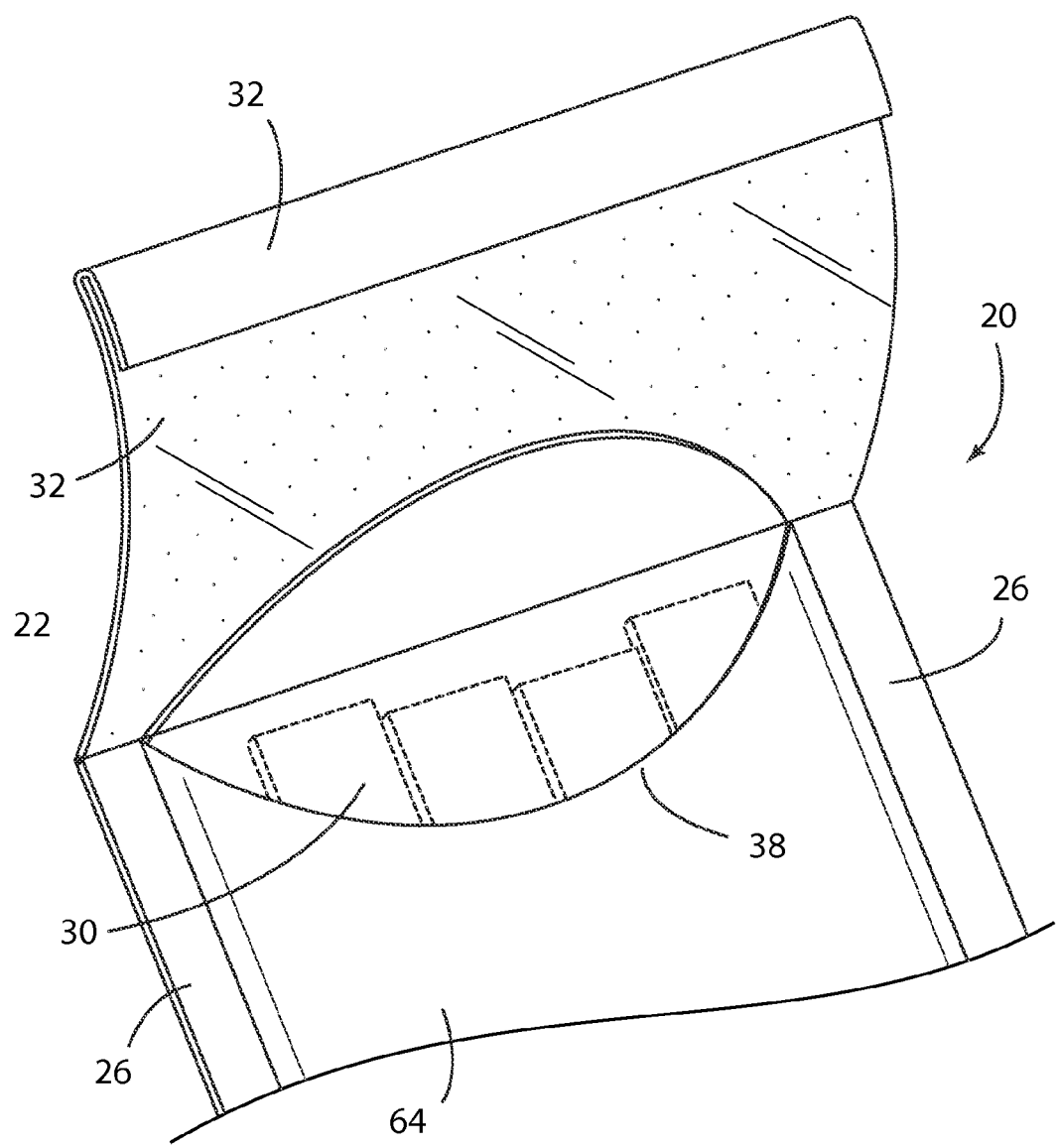
FIG. 34 illustrates a perspective front view of a first alternate exemplary re-closeable flexible film package label of the present embodiments in an open position.

The illustrated embodiments provide a label substrate 24 (continuous or discrete) laminated to film 22 by a PSA 32 (FIG. 5). The label, as described herein, can include any film or laminate configurations that can be applied to the package film to function as a reclosable flap. As shown in FIGS. 1-3, label 24 has a peelable adhesive portion 32 and a non-adhesive region 36 to serve as a tab. Label 24 is preferably configured to cover at least score line 38. Peel tab 36 can be formed by removing, covering (See FIG. 1), or deadening/deactivating PSA 32. For example, a coating process (such as with an ink or varnish) can be used to deaden the adhesive for the area 36 of label 24. Alternately, a separate lamination can be added, such as a paper liner, to provide the non-adhesive portion 36 of label 24. In further alternate embodiments, the non-adhesive edge of the label can be a portion of the label folded onto itself so that PSA surfaces are adjacent to one another (See, FIG. 34). In another approach, the label can be zone coated with PSA, which excludes the portion of the label to be used as the non-adhesive area 36.

Label 24 can be transparent (as shown), opaque or optionally printed. In a preferred embodiment, the applied label 24 can be a linerless label continuously applied longitudinally to the flow of the film. Thus, label liner waste can be eliminated and since the label is continuous, and the step of precise registration of the label on each unit of the product is not required. It is noted though that label 24 can be generally described as any film with an adhesive covering and be within the scope of the presented embodiments. It is also noted that labels with liners can also be used within the scope of the presented embodiments.

Linerless labels can be a face-stock for label 24, having a PSA coating on one side but can be rolled into a spool without a liner. This can be accomplished by a release coating applied to the side opposite the adhesive coating. Face-stocks can include standard paper, film, plastic, fabric, foil, direct thermal, and the like. Linerless labels are available with removable and repositionable adhesives. Alternatively an adhesive covered flexible film can be used for label 24.

As illustrated, label 24 can be applied to film 22 as a continuous label with a PSA. It is noted though that in alternate embodiments, the label can be a discretely applied label, a discrete label formed by top cutting a continuously applied layer, or provided as an interstitial layer to a laminated film.

In the present embodiments, label 24 can be laminated to film 22 by PSA 32. As stated above, peel strength between package 20 surface and label 24 should be greater than the force required to separate the film along the score line 38. As such, label 24 is peelable with respect to package 20 surface, including portions of label 24 exposed to the sealing process of side seals 26 (See below).

An exemplary label embodiment for package configurations described herein can be about 50 to 500 gauge and, preferably, about 100 to 250 gauge polyester or oriented polypropylene (OPP). Other types of semi-rigid polymer, such as PET, can also be used. OPP embodiments can include bi-axially oriented polypropylene (BOPP). The label can be opaque, but preferably clear. A specific embodiment can be about a 200 gauge (2 mil) BOPP clear film having about a 10-200 PSA coating (and preferably about 100 gauge (1 mil)) that can optionally be covered for shipping by about a 100 gauge (1 mil) polyester liner (greater than 18 gauge). The optional liner can be removed prior to being applied to the package film. Liner can also be used as the deadening agent for the adhesive free zone.

PET can be advantageous if thermal resistance in creating a non-peelable seal is desired. Preferably, PSA is applied directly to the film but can be applied to ink or any other coating on the film. The PSA should remain attached to the label 24, even after repeated openings and reclosures. PSA 32 is preferably neutral or non-reactive to the product and can be configured to provide a reclosable seal even in refrigerated conditions (i.e., the PSA is operable in a temperature range of about −10 to 90 degrees Celsius). Label 24 can be applied to cover score line 38, while leaving a sufficient marginal region of label 24 to expose enough PSA 36 to substantially reclose the package opening define by score line 38 (See e.g., FIG. 1).

FIGS. 28, 37-38, 42, 46-47, 54-55, illustrate embodiments where the label is top cut to form various tab shapes or even to form discrete labels. For example, FIG. 28 shows one approach where section of a label roll for a package embodiment has a scored shaped label edge 80. As shown, the score provides a 'sine wave' shaped label edge/tab, though it is understood that many types of shaped label edges are possible. Further, the scoring process can even etch indicia, such as words (e.g., 'LIFT HERE'). Area 82 illustrates the label matrix beyond the score line that can be removed prior to applying the label roll to a film laminate (See FIG. 33 and description herein). It is also noted that area 36*i* illustrates a non-adhesive portion of the label. It is also noted that the score device 322 could also score the label to allow it to resemble a discrete label on the film once the matrix is removed.

Another approach to a label is shown as label 24*i* in FIGS. 43 and 44. In this approach, label 24*i* can be applied as a continuous label, and then top cut with a portion of the label matrix removed to give the finished package a discrete label. As shown in FIGS. 43 and 44, label 24*i* can be fixed to film 22*i*/22*ii* by an adhesive 32*i*. Adhesive 32*i* can be in the range of about 20 gauge to about 200 gauge in thickness, preferably in the range of about 70 to 90 gauge and most preferably about 80 gauge. Adhesive 32*i* can have a peel force in the range of about 100 to 1,000 grams/24.4 mm squared. Label 24*i* can be in thickness in the range of about 50 to 300 gauge, preferably in the range of about 160 gauge to about 240 gauge. Label 24*i* can be formed from an oriented polyester, an oriented nylon, or even paper.

During assembly of the present embodiments, label 24 (closure layer) can be laminated to film 22. End seal 28 and side seals 26 can be formed as two film 22 edges are joined and sealed by heated wheels or seal jaws. As discussed above, a sealant layer can be applied to the film to facilitate the type of desired seal. This internal adhesive can be applied up to 100 percent of the interior surface or only where it is needed to provide a seal. The present embodiments do require an additional package fin or lap seal.

The method to assemble package 20 of the present embodiments can use heat seals, cold seals, extrusion and adhesive lamination, or co-extrusion. The label can be applied continuously along the longitudinal length of the flow film. When the products are enveloped and sealed within the flow film, the flow film/label laminate can be cut into individual packages.

One exemplary 'in-line' method of making one package embodiment is generally shown in FIG. 6 at 68, using a packaging apparatus that positions film above the product, then wraps the film downwards to form a fold line 34. An end seal 28 is formed beneath the product 30.

Figure 4:
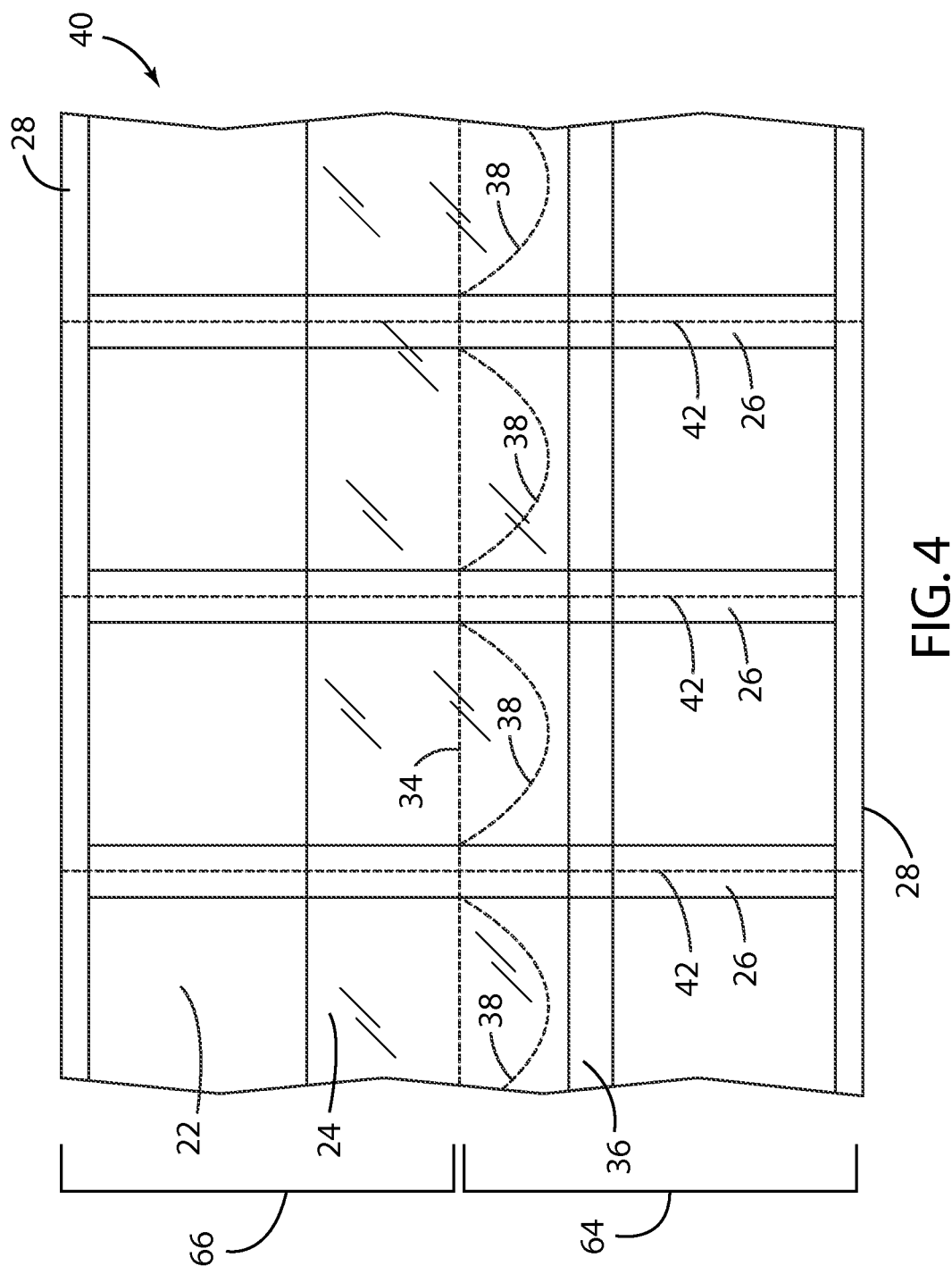
FIG. 4 illustrates a planar view of a section of a film/label laminate prior to assembly of an exemplary reclosable flexible film package of the present embodiments.

As shown, film 22 and label 24 (transparent for this illustration) are joined from their respective feed rolls at 62. It is noted though that the label may be pre-applied to the film to be processed as a single feed roll. The film/label laminate could look like the blank feed 40 illustrated in FIG. 4. In this approach, the blank is a single in-line blank feed, though dual in-line blanks can be formed (See e.g., FIGS. 37-42). FIG. 4 shows the areas of front panel 64 and back panel 66, fold line 34, cut line 42, and sealing areas 28 and 26. Also, as shown, label 24 is oriented to provide approximately equal portions of the label on the front and back panel. Also, the adhesive portion 32 of label 24 is oriented to cover score line 38 and to provide enough exposed adhesive to reclose (or even reseal) the package after opening. Thus, the portion of the label extending beyond the fold line to the back panel can vary, or even stop at the fold line.

After the film/label lamination, film 12 can be scored at 50 on the film surface directed to the interior of the package, though the top surface could also be scored. Preferably, scoring occurs after the continuous label is applied but could be applied prior to lamination or even supplied on the feed roll. As described above, score 38 can be formed by laser, mechanical means, such as a knife, and the like.

Once scored, the film is folded around product and the edges are sealed at folding device 78. As illustrated in FIG. 7, the end seal is formed first. It is noted though that in alternate embodiments, side seals 26 can be formed first and the product inserted before closing end seal 28. The sealant layers can be heated and compressed by wheels pressed together, which activates the heat sealant layer on the interior layer. Where EVA, and the like, are used for a sealant layer, the heated wheels can be heated to between about 85 and 205 degrees Celsius. Again, line speed and film thickness are also a factor in the seal formation as are its desired peelability and hermeticity. As shown in FIGS. 1-3, end seal 28 is oriented to the bottom of package 20.

As shown in the illustration of FIG. 6, once the film has enveloped product 30, side seals 26 can be formed by adjacent upper and lower seal jaws 54, which not only can heat seal the sides 26 of the package, but can also cut the film between side seals to separate the packages. A knife cut in seal jaws 54 can fully separate individual packages (See FIG. 8) or, alternately, partially cut or perforate the cut between the packages to hold them together in groups (e.g., bandolier packaging). It is noted that the sealing jaws 54 of FIG. 8 would contact each other during assembly, but are shown extended out a bit for ease of understanding this embodiment. Alternately, film 22 could be pre-perforated and indexed to correspond to the middle seal 26. Seals 26 and 28 can optionally be formed from patterns imprinted on heated wheels 52 or seal jaws 54, which could emboss the film as it is pulled through the manufacturing process. It is noted that side seals 26 would provide sealing to the interior surfaces of film 22, but would not react with the PSA of label 24. This allows label 24 to peel even after going through sealing jaws 54.

Figure 33:
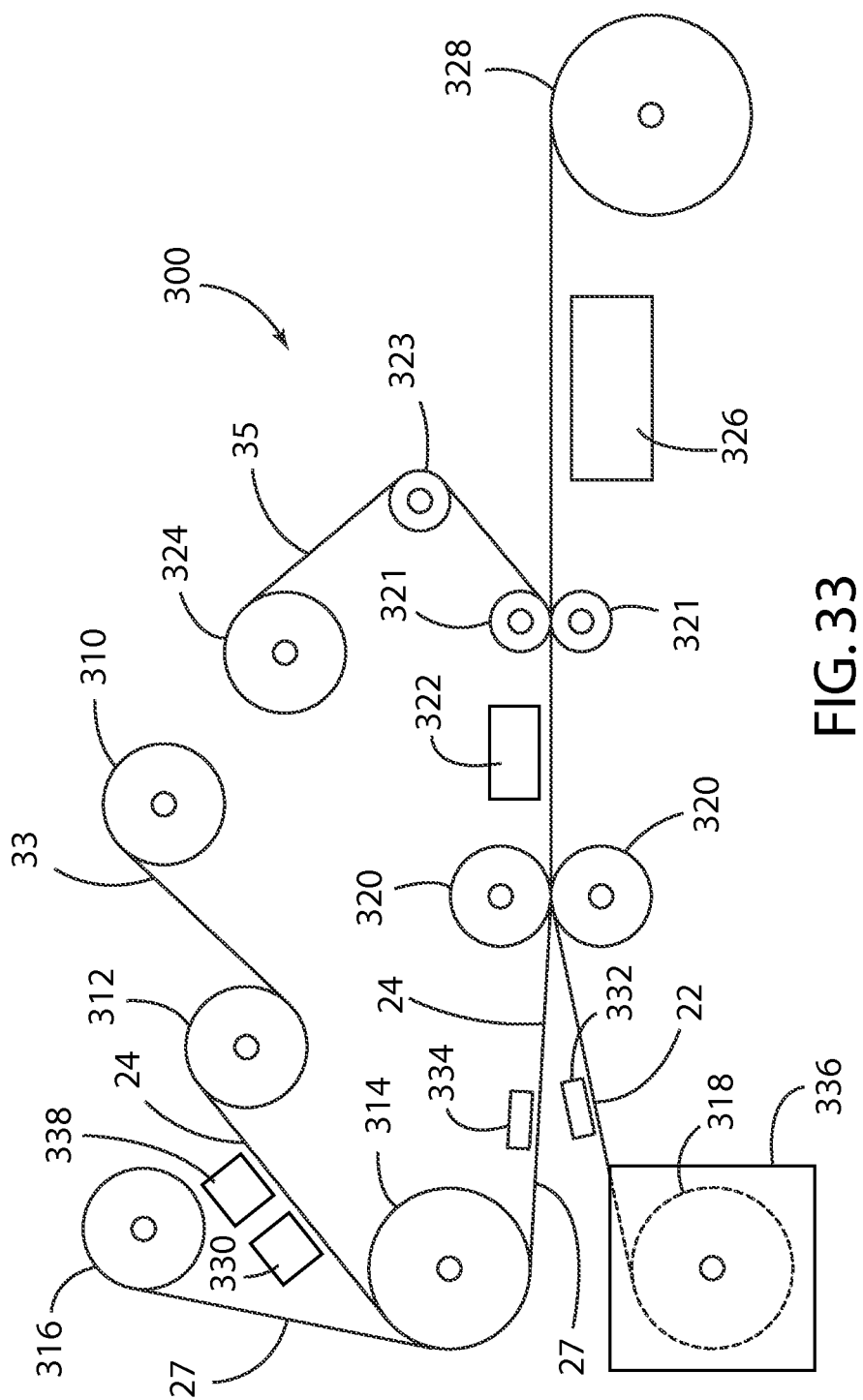
FIG. 33 illustrates a side view of an exemplary off-line assembly process to form and package a product using a scored flexible film package of the present embodiments with a continuous label.
Figure 45:
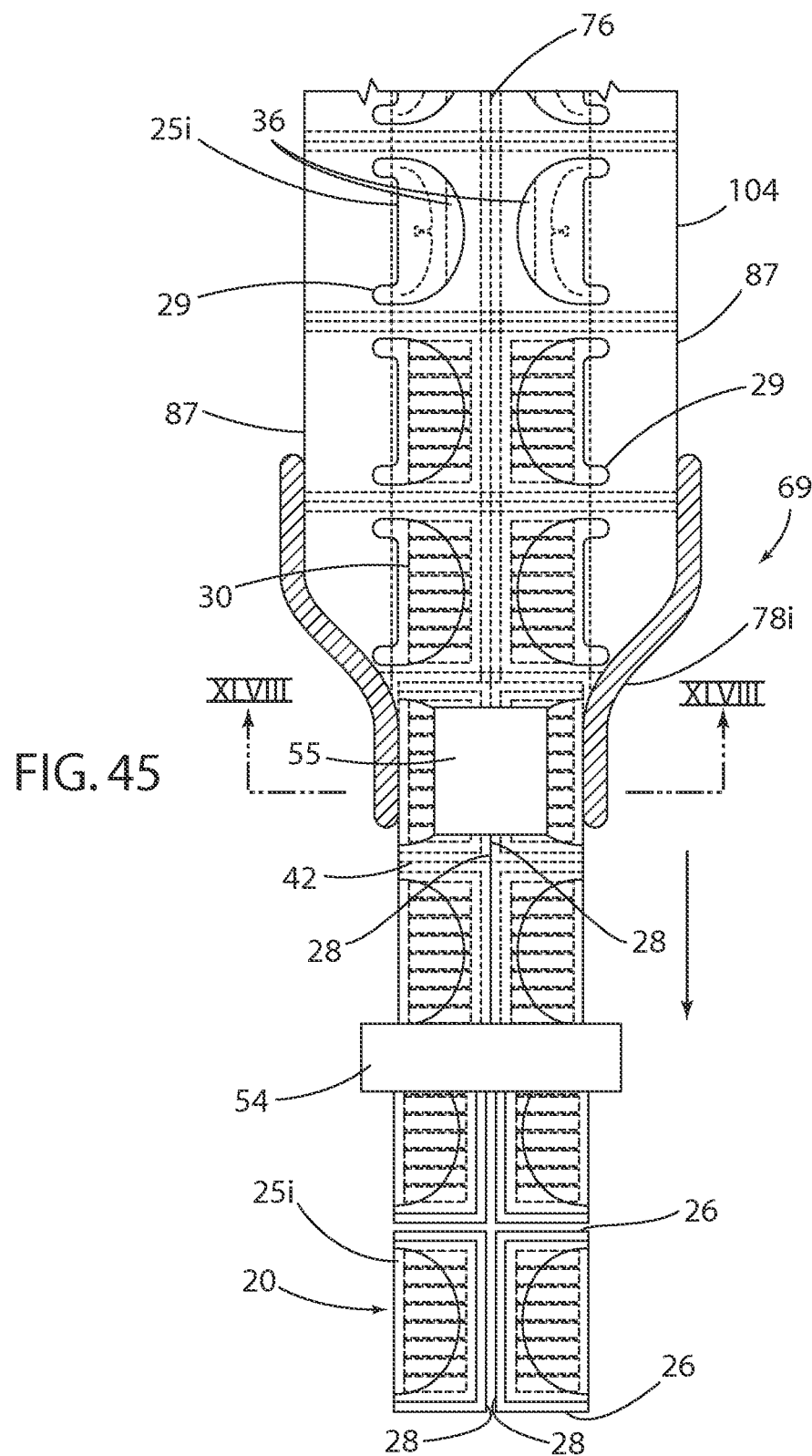
FIG. 45 illustrates a top view of an exemplary in-line assembly process to form and package a product using a scored flexible film package according to one approach of the present embodiments with a discrete label.

An exemplary 'off-line' lamination process to develop a dual lane package scored film/label laminate is shown in FIG. 33 and generally indicated at 300 and can be configured for producing a package such as that shown in FIG. 45. As shown, a label roll with liner 312 can laminate label 24 with an optional deadening label 27 from roll 316 at roller 314. Where a label liner 33 is present, it can be peeled from roll 312, then rolled up at 310. It is noted that this feature would not be present where linerless labels are used. Next, the label (single label or a multiple label lamination) is laminated to a film roll 318 at nip rollers 320.

Further, the label can optionally be scored or cut. This label cut may extend completely or nearly completely through the thickness of the label. FIG. 33 illustrates that such a label cut may be formed after the label is applied to the film web such that the label is 'top-cut' or cut from the side of the label away from the film. The label cut or 'top-cut' may be used to form a shaped tab or flap configuration at an optional first scoring device 322 (see e.g., FIG. 37 and score 80 in FIG. 28). This top-cut of the label by device 322 can shape the label as a continuous label that extends from one edge of the package to another opposing edge of the package (e.g., FIGS. 28 and 37) or as a discrete label that extends less than the width or length of the package and in between the opposing edges of the package (e.g., FIGS. 38 and 46-47). The portion of the continuously applied label that does not form a package label is the unused label matrix 35 and can be peeled off the lamination at nip rollers 321 and wound onto a label matrix wind-up 324 via a take-off roller 323. Film 22 of the resultant laminate with the shaped and lined tab, if any, can next be scored ('bottom-cut') at scoring device 326. Film/label laminate can then be formed into a roll 328. It is noted that bottom-cut scoring device can also be positioned between nip rollers 320 and 321.

The pull tab or tack free gripping portion may be formed in a number of additional manners. For example, instead of a second, deadening label 27, a coating or other adhesive deadening means, such as an ink coating or heat inactivation, can be applied to select areas of the adhesive side of label by adhesive deactivating device 330. Further, such adhesive deactivation may be done in a pattern-applied approach and, indeed, the adhesive application may also be pattern-applied. The adhesive deactivating process can also include an adhesive coating applicator 338, which can be positioned anywhere along the line before being laminated to film 22 at nip rollers 320. Adhesive coating applicator 338 can apply adhesive in either a machine direction or even zone applied, such as in a transverse direction. In the instance of a zone application of an adhesive, the adhesive coating step can be eliminated since the adhesive would only be applied as configured. Accordingly, neither deadening label 27, nor adhesive deadening device 330 would be needed if the adhesive on label 24 is pattern applied so as to have a portion free of adhesive.

In another approach, film roll 318 can be pulled from an unwinding station 336. Materials that feed from unwinding station 336 may optionally include film printing on film 318 top surface and even reverse printing on film bottom surface. Printing can be by flexographic, lithography and rotogravure. Unwind station 336 can include film laminations, application of adhesives, extrusions, heat lamination, and the like. The film/web structure from role 318 can include mono to multi film layers.

In another approach, the film/label lamination device shown in FIG. 33 can also include a printer 332 for printing film that feeds from unwind station 336. Printing can include surface printing in flexographic, lithography and rotogravure and can be used as a device to coat adhesive surfaces on film from film roll 318.

In yet another approach, a slitting station 334 can be added to reduce label stack faces or to cut the label into multiple lanes.

Accordingly, there are many potential approaches that can be embodied either 'off-line' (e.g., FIG. 33) or 'in-line' (e.g., FIGS. 6 and 45) to assemble and configure film/label blank laminations for use in forming flexible packaging. FIGS. 37-42 provide just a few exemplary approaches.

For example, FIG. 37 shows a planar view of a section of a film/label laminate prior to assembly of an exemplary re-closeable flexible film package generally indicated at 100. In this approach, the film can form dual lane in-line packages, which are ultimately cut during assembly at cut line 76 in the longitudinal direction and cut lines 42 in the transverse direction. Here area product placement zones are shown at 31. In this embodiment, top cut 60 forms an arc shaped peel tab that extends beyond fold line 34 but label 24 is still continuous in the longitudinal direction. Non-adhesive area 36 can be formed by a second label 27 or other means as described herein.

FIG. 38 illustrates a planar view of a section of another approach for a film/label laminate prior to assembly of an exemplary re-closeable flexible film package and is generally indicated at 102. In this approach, top cut 60 extends the peel tab arc to the label edge 39. Once the label matrix 35 is removed the remaining label forms a discrete label 25.

FIG. 39 illustrates a planar view of a section of a film 22 prior to assembly of an exemplary re-closeable flexible film package according to one approach of the present embodiments. In this approach, the bottom film cut score line (line of weakness) 38 includes PIF 74 features.

Figure 40:
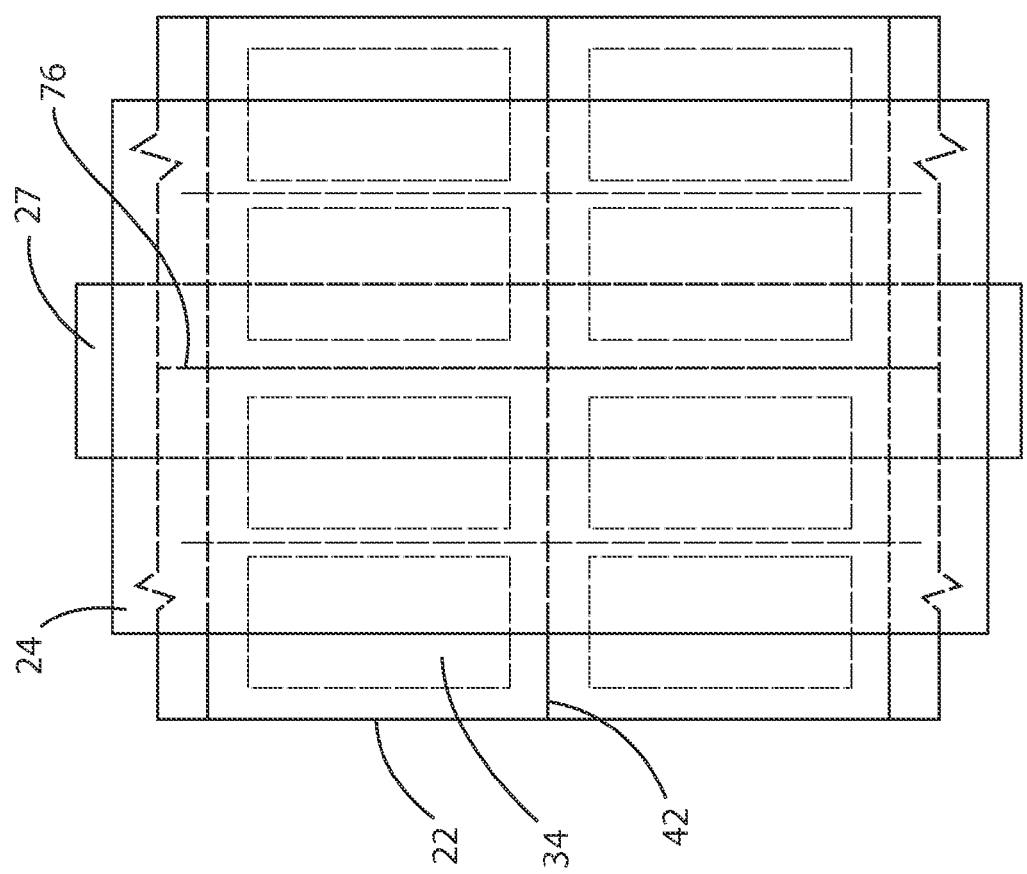
FIG. 40 illustrates a planar view of a section of a film/label laminate of an exemplary re-closeable flexible film package according to one approach of the present embodiments.
Figure 41:
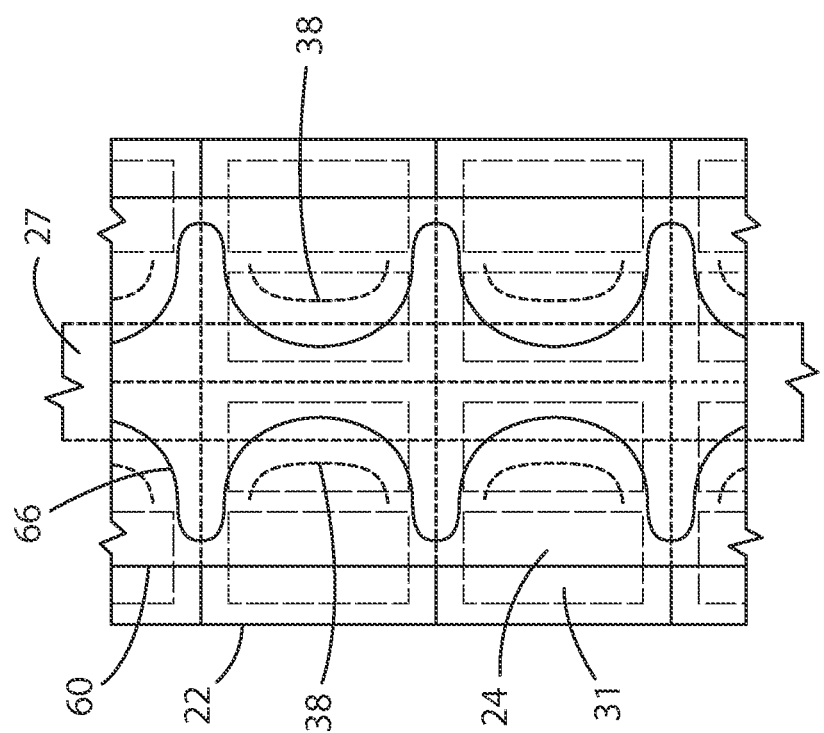
FIG. 41 illustrates a planar view of a section of a film/label laminate prior to assembly of an exemplary re-closeable flexible film package according to one approach of the present embodiments.

FIG. 40 illustrates a planar view of a section of a film/label laminate prior to a top cut of the label and a scoring of the film (bottom cut) and prior to assembly of an exemplary re-closeable flexible film package. As shown, second label 27 is laminated between film 22 and label 24. FIG. 41 shows the laminations of FIG. 40 after the label has been top cut at 66 and the film scored at 38, but showing the orientation of second label 27.

Figure 42:
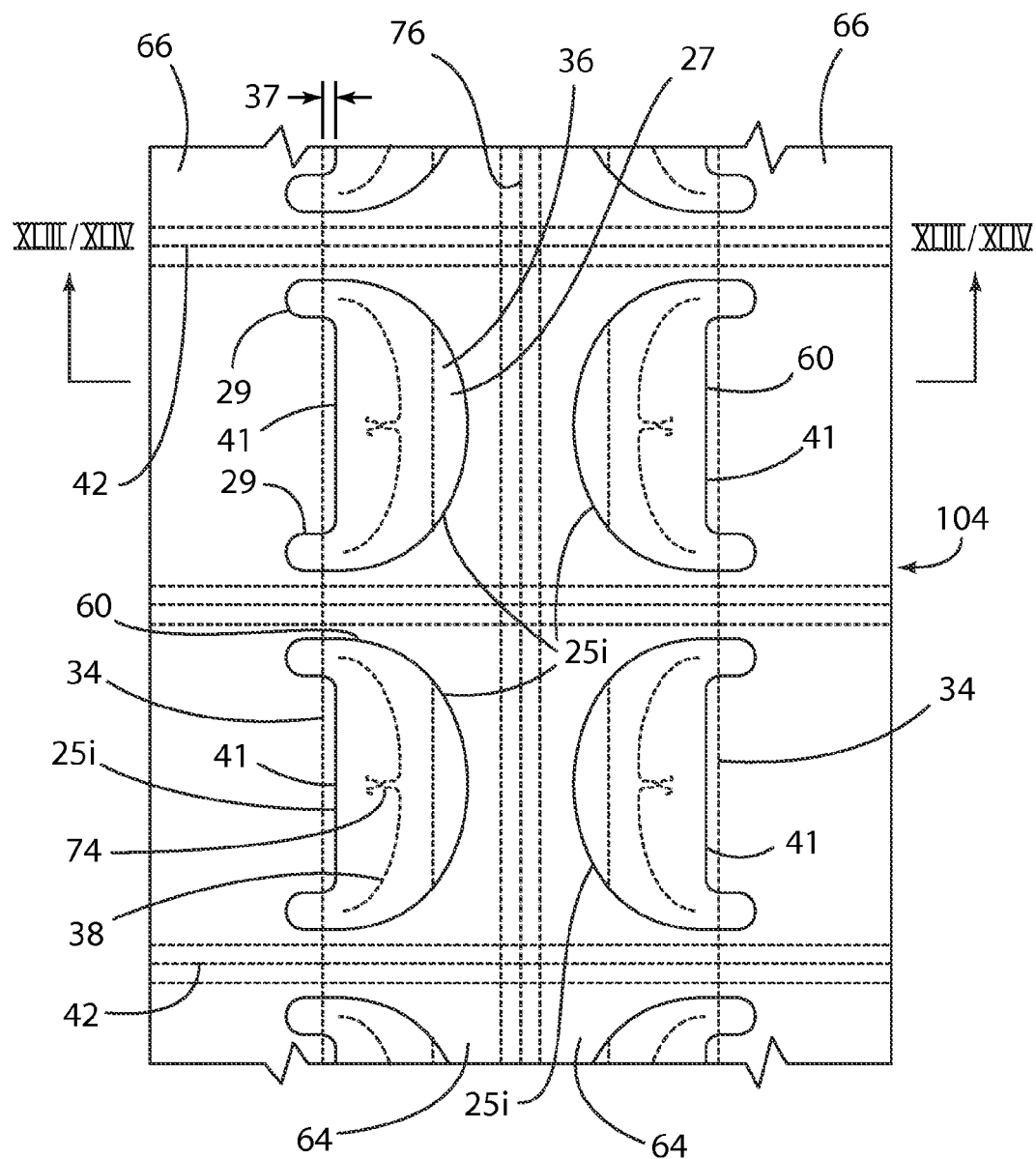
FIG. 42 illustrates a plan view of a section of a film/label laminate prior to assembly of an exemplary re-closeable flexible film package according to one approach of the present embodiments.

FIG. 42 illustrates a planar view of a section of another approach for a film/label laminate prior to assembly of an exemplary re-closeable flexible film package and is generally indicated at 104. In this approach, top cut 60 forms a discrete label 25i having an arc peel tab for the front panel 64 and tabs 29 extending over fold line 34 to back panel 66 (See, FIGS. 46 and 47). Accordingly, only a portion of the film/label lamination (e.g., tabs 29) is folded at fold line 34. This can allow for easier folding of the package. As shown, label 25i has an edge portion 41 generally running parallel to fold line 34. Label 25i edge portion 41 can be at or near fold line 34, but is preferably about 1-2 mm distant from the fold line at dimension 37.

Figure 48:
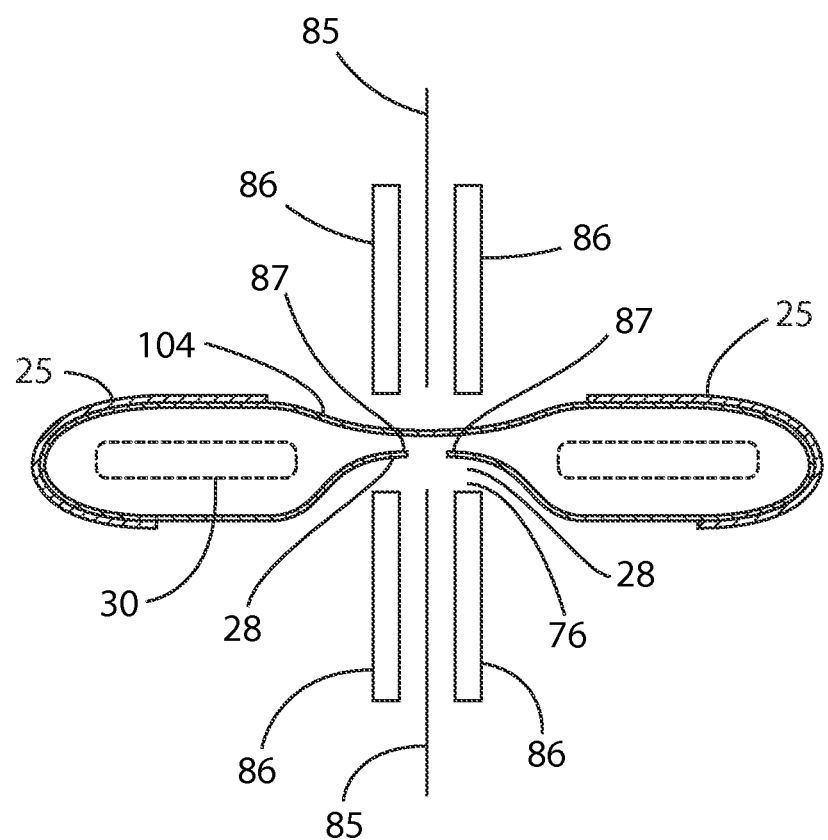
FIG. 48 illustrates a cross-sectional view taken along section line XLVIII-XLVIII of FIG. 45 of an end seal and cut device of an exemplary assembly process to form and package a product using a scored flexible film package of the present embodiments with a continuous label.
Figure 49:
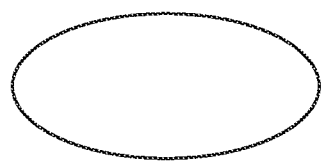
FIGS. 49-53 illustrate alternate score lines for an opening of exemplary re-closeable flexible film packages of the present embodiments.
Figure 50:
Figure 51:
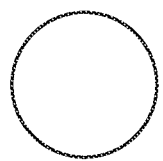
Figure 52:
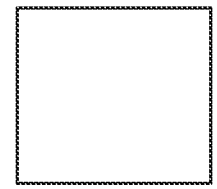
Figure 53:
Figure 54:
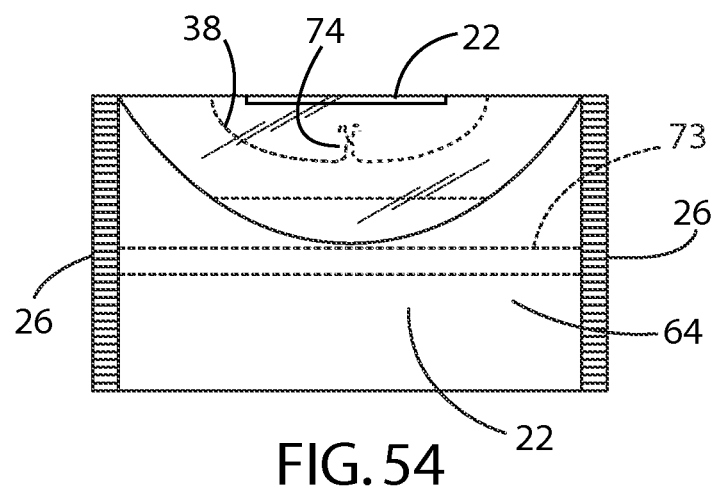
FIG. 54 illustrates a perspective front view of an exemplary re-closeable flexible film package according to one approach of the present embodiments in a closed position.
Figure 55:
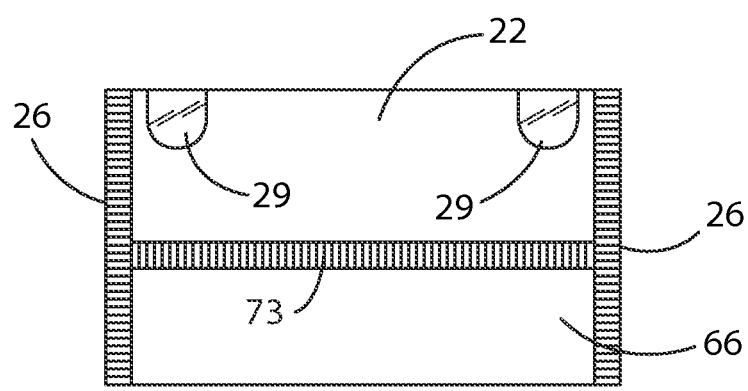
FIG. 55 illustrates a perspective back view of an exemplary re-closeable flexible film package according to one approach of the present embodiments.

FIG. 45 shows a schematic of another exemplary 'in-line' packaging apparatus 69 to assemble a package 20 using film/label laminate 104. In this approach packaging apparatus 69 positions film 104 above dual lines of product 30, then wraps the film downwards and envelops product 30 with folding device 78i until the longitudinal edges of film 34 meet at or near cut line 76. A device 55 can form dual end seals 28 by dual adjacent upper and lower sealing wheels 86 and cut the film along cut line 76 with knife 85. See also, FIG. 48. Knife 85 can fully separate the two lines of packages or, alternately, partially cut or perforate the cut between the packages to hold them together. It is noted that the sealing jaws 86 and knife 85 of FIGS. 45 and 48 would contact each other during assembly, but are shown extended out a bit for ease of understanding this embodiment. Similarly, at device 54, side seals 26 can be formed and individual packages 20 cut such as described for FIGS. 6-8 above. It is noted that the sequence of steps can be flexible in that device 54 can also be placed upstream of device 55.

Accordingly, in use of the configuration of the embodiment of FIGS. 1-3, a user can grip the unsealed inner surface 36 of label 24 with one hand and pull the label away from the package to expose the package interior. Typically, the label is pulled in the direction of folded top edge of the package. As the label peel tab 36 is peeled back upwardly, the film breaches/separates along score line 38 to form a package opening and exposing the PSA 32. As shown in FIG. 1, film 22 beyond the direction of the label pull remains attached to the label. Preferably, label 24 is not pulled off package 20 in use.

While preferred embodiments have been described in detail, variations and modifications can be effected within the configurations described herein.

We claim:

1. A reclosable flexible film package comprising:
   a sheet of flexible film forming a front panel and a rear panel with a fold therebetween, opposing free edges of the flexible film being sealed together to form a first side seal, a second side seal, and an end seal such that the front and back panels define an interior space;
   a score in the flexible film of the front panel forming a flap that defines an opening when lifted from a remainder of the package and has a separation force for the flap from the film, the score having a first score end and a second score end disposed adjacent the fold such that the opening is disposed adjacent the fold;
   a label extending uninterrupted from the first side seal to the second side seal, the label extending over less than an entire surface of the flexible film, the label being attached onto the film by pressure sensitive adhesive that is disposed over an entire surface of the label, and extending beyond the score on the front panel to reseal the package opening defined by the flap and the label extending over the fold onto the back panel, the pressure sensitive adhesive having a peel strength between the film and the label that is greater than the separation force along the score, and the label further having a pull tab configured such that the flap of the flexible film is lifted from the remainder of the package when the pull tab of the label is grasped and pulled away from the remainder of the package; and
   wherein the pull tab includes a substrate disposed over the pressure sensitive adhesive of the label and the substrate extending uninterrupted from the first side seal to the second side seal.

2. The package of claim 1, wherein the first score end is dispose adjacent a first inward edge of the first side seal and the second score end is disposed adjacent a second inward edge of the second side seal.

3. The package of claim 1, wherein the score includes at least one of: an arcuate line and a perforation.

4. The package of claim 1, wherein the first and second score ends include a tear-inhibiting feature.

5. The package of claim 1, wherein the label extends equidistant on the front and back panel from the fold.

6. The package of claim 1 further comprising a midsection of the score between the first and second score ends, the midsection disposed a distance from the fold.

7. The package of claim 1, wherein the film is a printed overwrap film laminate comprising a reverse printed oriented polypropylene (OPP) clear film bonded to a white OPP package film.

8. The package of claim 7, wherein the OPP clear film is a gauge in the range of about 90-230 and the white OPP package film is a gauge in the range of about 90-230.

9. The package of claim 7, wherein the OPP clear film is about 118 gauge and the white OPP package film is about 118 gauge.

10. The package of claim 1, wherein the label is a bi-axially oriented polypropylene (BOPP) clear film of a gauge in the range of about 160 to 240.

11. The package of claim 1, wherein the flexible film is a BOPP clear film of a gauge of about 200.

12. A reclosable package comprising:
a first substrate forming a front panel and a back panel having a first side seal, a second side seal, and an end seal to form an interior cavity for receiving items;
a flap defined by a line of weakness in at least a first panel that defines an opening to the interior cavity when the first panel is separated at the line of weakness;
a second substrate adhered to the first substrate via a pressure sensitive adhesive continuously disposed on the second substrate and the second substrate extending over less than an entire surface of the first substrate, the second substrate having a first portion extending beyond the line of weakness to form a package reseal zone, and a second portion extending from a portion of the first panel to a portion of the second panel and wherein the second substrate extends uninterrupted from the first side seal to the second side seal; and
a third substrate disposed over the pressure sensitive adhesive to form a pull tab, the third substrate extending from the first side seal to the second side seal.

13. The package of claim 12, wherein the line of weakness is a perforation.

14. The package of claim 12, wherein the first substrate is a printed overwrap film laminate comprising a reverse printed oriented polypropylene (OPP) clear film bonded to a white OPP package film.

15. The package of claim 14, wherein the OPP clear film is a gauge in the range of about 48-230 and the white OPP package film is a gauge in the range of about 48-230.

16. The package of claim 14, wherein the OPP clear film is about 118 gauge and the white OPP package film is about 118 gauge.

17. The package of claim 12, wherein the second substrate is a bi-axially oriented polypropylene (BOPP) clear film of a gauge in the range of about 160 to 240.

18. The package of claim 12, wherein the first substrate is a BOPP clear film of a gauge of about 200.

19. The package of claim 12, wherein the line of weakness includes a first end and a second end disposed adjacent a package fold and the first end is disposed adjacent a first inward edge of the peripheral seal and the second end is disposed adjacent a second inward edge of the peripheral seal.

20. The package of claim 12 wherein the first and second ends of the line of weakness include a tear-inhibiting feature.

21. A reclosable package comprising:
a multi-layer laminate film, the laminate film having at least a sealant layer, a barrier layer, an adhesive layer, and a stiffening layer, the laminate film having a fold therein and forming a front panel and a back panel with a first side seal, a second side seal, and an end seal formed therein to form an interior cavity;
a line of weakness formed in the multi-layer laminate film, the line of weakness defining at least in part a package opening, the line of weakness having first and second ends disposed adjacent the fold such that the package opening is subsequently disposed adjacent the fold;
a closure layer attached to the multi-layer laminate film with an adhesive disposed on an entire surface thereof and extending over the line of weakness, the closure layer extending from a first package edge to a second package edge and over less than an entire surface of the laminate film; and
a substrate disposed over a portion of the adhesive of the closure layer, the substrate forming a pull tab with the closure layer, the substrate extending uninterrupted from the first side seal to the second side seal.

22. The reclosable package of claim 21 wherein the laminate film further comprises a polyester layer and an additional adhesive layer.

23. The reclosable package of claim 21 wherein the laminate film further comprises a release layer.

24. The reclosable package of claim 21 wherein the stiffening layer comprises a fiber substrate.

25. The package of claim 21 wherein the line of weakness further includes a tear-inhibiting feature.

26. The package of claim 21 wherein the first end is disposed adjacent a first inward edge of the peripheral seal and the second end is disposed adjacent a second inward edge of the peripheral seal.

* * * * *